(12) United States Patent
Ohta

(10) Patent No.: US 10,777,082 B2
(45) Date of Patent: Sep. 15, 2020

(54) DRIVING ASSISTANCE APPARATUS FOR VEHICLE

(71) Applicant: TOYOTA JIDOSHA KABUSHIKI KAISHA, Toyota-shi, Aichi-ken (JP)

(72) Inventor: Teppei Ohta, Susono (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 111 days.

(21) Appl. No.: 15/826,089

(22) Filed: Nov. 29, 2017

(65) Prior Publication Data

US 2018/0174463 A1 Jun. 21, 2018

(30) Foreign Application Priority Data

Dec. 19, 2016 (JP) ................................ 2016-245542

(51) Int. Cl.
*G08G 1/16* (2006.01)
*H04N 5/225* (2006.01)
(Continued)

(52) U.S. Cl.
CPC ............ *G08G 1/166* (2013.01); *B60K 35/00* (2013.01); *B60W 30/08* (2013.01); *G02B 27/01* (2013.01); *G02B 27/0101* (2013.01); *G06T 7/593* (2017.01); *H04N 5/2251* (2013.01); *H04N 5/2253* (2013.01); *H04N 5/2259* (2013.01); *B60K 2370/157* (2019.05);
(Continued)

(58) Field of Classification Search
USPC ........................................................ 348/148
See application file for complete search history.

(56) References Cited

U.S. PATENT DOCUMENTS

2010/0217483 A1* 8/2010 Matsuno ................ G08G 1/165
701/36

FOREIGN PATENT DOCUMENTS

DE 102010000383 A1 8/2010
DE 102012208188 A1 11/2013
(Continued)

OTHER PUBLICATIONS

Machine translation of JP 2015-141490 A (Year: 2015).*
Machine translation of KR 20170083798 A (Year: 2017).*
U.S. Appl. No. 15/720,870, filed Sep. 29, 2017, 29 pages.

*Primary Examiner* — Christopher S Kelley
*Assistant Examiner* — Ana Picon-Feliciano
(74) *Attorney, Agent, or Firm* — Hunton Andrews Kuth LLP

(57) ABSTRACT

A driving assistance apparatus for a vehicle includes an imaging device, an ECU, and a head-up display device. When a position in which a straight line connecting a predetermined position and a position of a particular object intersects with a position estimating plane that is a virtual plane position on the same plane as a virtual display area is defined as a particular object estimation position, an indicator is a motion indicator moving such that a tip end of the indicator approaches the estimation position along a virtual straight line set in the virtual display area with lapse of time, and the ECU is configured to perform control such that a position shift amount of the estimation position shifted from the virtual straight line in a width direction of a vehicle on the position estimating plane is equal to or less than a predetermined value in a predetermined pre-collision time.

3 Claims, 13 Drawing Sheets

(51) Int. Cl.
   *G02B 27/01* (2006.01)
   *B60W 30/08* (2012.01)
   *G06T 7/593* (2017.01)
   *B60K 35/00* (2006.01)
(52) U.S. Cl.
   CPC ............... *B60K 2370/1529* (2019.05); *B60K 2370/167* (2019.05); *B60K 2370/178* (2019.05); *B60K 2370/179* (2019.05); *B60K 2370/186* (2019.05); *B60K 2370/191* (2019.05); *B60K 2370/193* (2019.05); *B60K 2370/334* (2019.05); *B60K 2370/52* (2019.05); *G02B 2027/0138* (2013.01); *G02B 2027/0141* (2013.01); *G06T 2207/10012* (2013.01); *G06T 2207/30261* (2013.01)

(56) References Cited

FOREIGN PATENT DOCUMENTS

| | | | |
|---|---|---|---|
| JP | 2015-141490 A | | 8/2015 |
| JP | 2015141490 A | * | 8/2015 |
| KR | 20170083798 A | * | 7/2017 |

\* cited by examiner

FIG. 20A
FIG. 20B
FIG. 20C
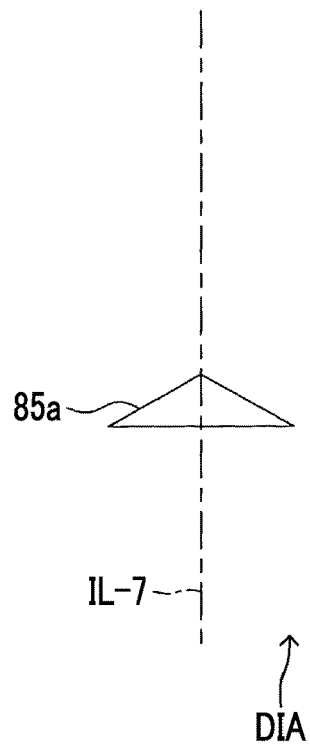
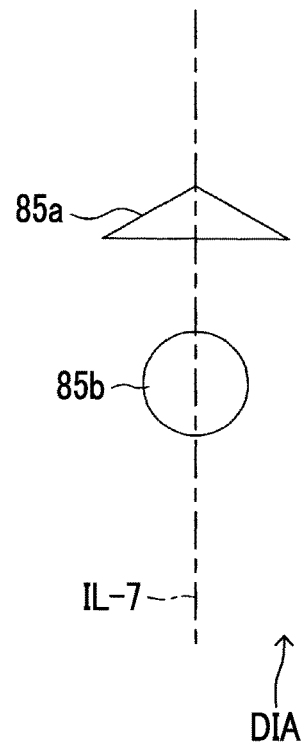
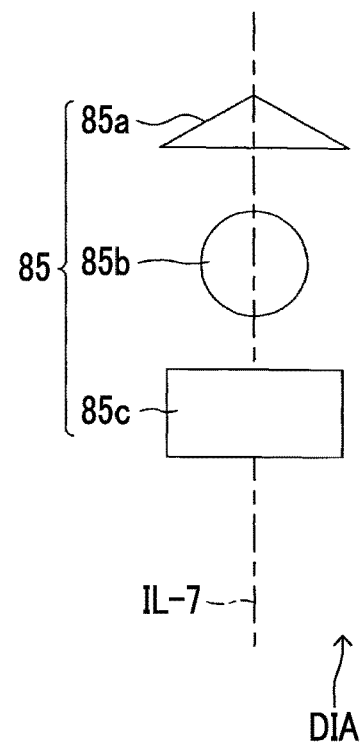
FIG. 21
RELATED ART
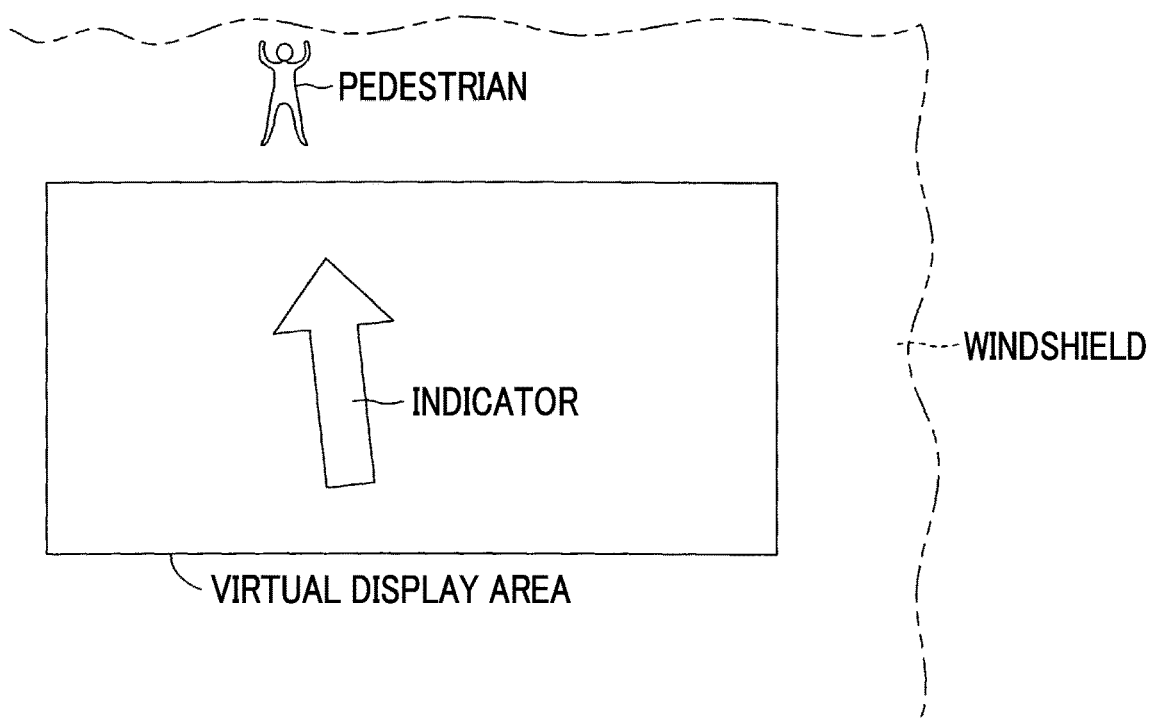

DRIVING ASSISTANCE APPARATUS FOR VEHICLE

INCORPORATION BY REFERENCE

The disclosure of Japanese Patent Application No. 2016-245542 filed on Dec. 19, 2016 including the specification, drawings and abstract is incorporated herein by reference in its entirety.

BACKGROUND

1. Technical Field

The disclosure relates to a driving assistance apparatus for a vehicle which includes a head-up display device.

2. Description of Related Art

Japanese Unexamined Patent Application Publication No. 2015-141490 (JP 2015-141490 A) discloses a vehicle having a camera and a head-up display (hereinafter, referred to as "HUD") mounted thereon.

The vehicle includes a transparent windshield positioned directly ahead of a driver seat and a camera disposed directly behind the windshield. The camera is able to capture a scene (that is, front scene) in front of the windshield which is visually perceived by a driver (occupant) seated on the driver seat through the windshield.

As is well known, when the HUD projects an indicator having a predetermined form on the windshield, the driver recognizes that a virtual image representing the indicator is formed in a virtual display area set in a position distanced from the windshield by a predetermined distance in front of the windshield.

In JP 2015-141490 A, when control means mounted on the vehicle determines that image data representing a pedestrian is included in data captured by the camera, the HUD performs a projection operation, and thus, a virtual image representing a predetermined indicator pointing at the pedestrian is formed in the virtual display area.

For instance, FIG. 21 shows examples of the virtual display area and the indicator of the related art. As shown in FIG. 21, the indicator has an arrow shape indicating that the indicator points at the pedestrian when the driver visually perceives the pedestrian through the windshield and recognizes the virtual display area. The indicator is projected while blinking. That is, the driver recognizes that the indicator is being turned on and off. Thus, the driver who recognizes the virtual image of the indicator formed in the virtual display area is able to recognize that there is the pedestrian in front of the vehicle.

SUMMARY

However, since the indicator of FIG. 21 is turned on and off, there is a possibility that the indicator will strongly irritate the eyes of the driver who recognizes the virtual image of the indicator. Thus, when the driver who recognizes the indicator of FIG. 21 is weak against such irritation, there is a possibility that the driver will have difficulties recognizing the pedestrian. That is, the HUD of the related art needs to improve a method of forming the virtual image of the indicator. The inventors have examined a method of displaying the indicator for smoothly guiding the line of sight of the driver so as not to give such strong irritation to the driver.

The HUD of the related art needs to improve a method of displaying the indicator when the vehicle turns. That is, according to the examination of the inventors, when a plurality of indication elements of the indicator is sequentially turned on (that is, the indication components are displayed in the form of an animation) so as to sequentially guide the line of sight of the driver, it is possible to smoothly guide the line of sight of the driver without strongly irritating the driver. However, it takes a predetermined time from when the display of the indicator is started to when the display of the indicator is ended. Meanwhile, when the vehicle is turning, a relative position of the vehicle relative to the pedestrian in a width direction of the vehicle is changed in proportion to each other for a predetermined time. Thus, when the display of the indicator is started so as to guide the line of sight of the driver toward a direction in which there is the pedestrian at the time of the start of the display, the direction in which the line of sight of the driver is guided by the indicator is greatly shifted from the direction of the pedestrian at the time of the end of the display of the indicator, and thus, there is a possibility that the indicator will give discomfort to the driver.

The disclosure provides a driving assistance apparatus for a vehicle which is capable of allowing an occupant of a vehicle to reliably recognize an indicator which is formed as a virtual image on a window of the vehicle or in a virtual display area set in front of the window by a head-up display device and points at a particular object positioned in front of the window and is capable of recognizing the indicator without giving discomfort to the occupant when the vehicle turns.

An aspect of the disclosure relates to a driving assistance apparatus for a vehicle. The driving assistance apparatus includes an imaging device configured to capture a front scene that is a scene in front of a transparent window and is visually perceived by an occupant seated on a driver seat of a vehicle through the window positioned directly ahead of the driver seat, an electronic control unit, and a head-up display device. The electronic control unit is configured to calculate a turning track of the vehicle based on a detection value that is a quantity indicating a turning state of the vehicle that is detected by a turning state quantity detection device, determine whether there is a particular object in the front scene based on image data captured by the imaging device, acquire relative positional information that is information regarding a relative position of the particular object relative to the vehicle, determine whether the vehicle and the particular object are to collide with each other based on the relative positional information and the turning track when the electronic control unit determines that there is the particular object and the vehicle that moves forward along the turning track of which curvature is equal to or greater than a predetermined curvature does not perform predetermined collision avoidance traveling, obtain a collision prediction time that is a time predicted that the vehicle and the particular object are to collide with each other and a collision prediction position of the vehicle relative to the particular object based on the relative positional information, the turning track, and a vehicle speed of the vehicle detected by a vehicle speed detection device when the electronic control unit determines that there is a relatively high probability that the vehicle and the particular object are to collide with each other, and obtain a relative position of the particular object in a predetermined pre-collision time that is later than a current time and is earlier than the collision prediction time based on the relative positional information and the collision prediction position. The head-up display device is configured to form a virtual image of a predetermined indicator that is recognized by the occupant when eyes of the occupant are in a particular positional relationship with a predetermined position on the window or in a virtual display area set in front of the window by projecting the indicator for a predetermined display time of which an end time matches the predetermined pre-collision time on the window or a reflection unit when a time to collision that is a time taken from the current time to the collision prediction time is equal to or less than a predetermined time threshold. When a position in which a straight line that connects the predetermined position and a position of the particular object intersects with a position estimating plane that is a virtual plane positioned on the same plane as the virtual display area is defined as a particular object estimation position, the indicator is a motion indicator that moves such that a tip end of the indicator approaches the particular object estimation position along a virtual straight line set in the virtual display area with lapse of time, and the electronic control unit is configured to perform control such that a position shift amount of the particular object estimation position shifted from the virtual straight line in a width direction of the vehicle on the position estimating plane is equal to or less than a predetermined value in the predetermined pre-collision time.

In the aspect of the disclosure, when the particular object interferes with predetermined side areas (to be described below) to be set on both right and left sides of the vehicle with the movement of the vehicle, the electronic control unit also determines that "the vehicle and the particular object are to collide with each other".

In the driving assistance apparatus according to the aspect of the disclosure, when the electronic control unit determines that the vehicle and the particular object are to collide with each other, the electronic control unit obtains the collision prediction time and the collision prediction position based on the relative positional information of the particular object relative to the vehicle, the turning track of the vehicle, and the vehicle speed. The electronic control unit obtains the relative position of the particular object relative to the vehicle in the predetermined pre-collision time which is later than the current time and is earlier than the collision prediction time based on the relative positional information and the collision prediction position. When the time to collision which is the time taken from the current time to the collision prediction time is equal to or less than the predetermined time threshold, the head-up display device forms the virtual image of the indicator capable of being recognized (visually perceived) by the occupant when the eyes of the occupant are in the particular positional relationship with the predetermined position on the window or in the virtual display area set in front of the window by projecting the predetermined indicator on the window or the reflection unit for the predetermined display time of which the end time matches the predetermined pre-collision time.

The (virtual image of the) indicator displayed in the virtual display area by the head-up display device of the driving assistance apparatus according to the aspect of the disclosure is the motion indicator that moves such that the tip end of the indicator approaches the particular object estimation position along the virtual straight line set in the virtual display area with lapse of time. Thus, the occupant who recognizes the motion indicator is able to more reliably recognize the particular object than when the occupant recognizes the indicator of the related art.

Incidentally, when the vehicle moves forward along the turning track of which the curvature is equal to or greater than the predetermined curvature, the relative position of the particular object relative to the vehicle in the width direction of the vehicle is changed in proportion to each other with lapse of time. Accordingly, in the predetermined time earlier than the predetermined pre-collision time, when the head-up display device starts the display of the motion indicator that moves along the virtual straight line which extends toward the particular object estimation position in the predetermined time, the position shift amount of the particular object shifted from the virtual straight line in the width direction of the vehicle which is recognized by the occupant in the predetermined pre-collision time is greater than the predetermined value. Thus, there is a higher possibility that the occupant who visually perceives the particular object and recognizes the motion indicator will feel discomfort in the predetermined pre-collision time.

In contrast, in the aspect of the disclosure, the position shift amount of the particular object estimation position shifted from the virtual straight line in the width direction of the vehicle on the position estimating plane is equal to or less than the predetermined value in the predetermined pre-collision time. Accordingly, the occupant who recognizes the virtual display area recognizes that the position shift amount of the particular object shifted from the movement direction (extension direction of the virtual straight line) of the motion indicator in the width direction of the vehicle is smaller than the predetermined value in the end time (predetermined pre-collision time) of the display time of the motion indicator. Thus, there is a lower possibility that the occupant who visually perceives the particular object and recognizes the motion indicator will feel discomfort in the predetermined pre-collision time.

In the driving assistance apparatus according to the aspect of the disclosure, the electronic control unit may be configured to perform control such that the particular object estimation position is positioned in the virtual straight line on the position estimating plane in the predetermined pre-collision time.

When the disclosure is implemented in this aspect, there is a lower possibility that the occupant who visually perceives the particular object and recognizes the motion indicator will feel discomfort in the predetermined pre-collision time.

In the driving assistance apparatus according to the aspect of the disclosure, the electronic control unit may be configured to obtain a position estimating line segment that connects a position of the particular object in the current time and the collision prediction position in the collision prediction time, obtain a value acquired by dividing a time taken from the current time to the predetermined pre-collision time by the time to collision, and calculate the relative position of the particular object relative to the vehicle in the predetermined pre-collision time by moving the position of the particular object in the current time toward the vehicle along the position estimating line segment by a value acquired by multiplying the position estimating line segment by the value acquired through the division.

When the disclosure is implemented in this aspect, the electronic control unit does not calculate the relative position of the particular object relative to the vehicle in the predetermined pre-collision time based on the turning track of the vehicle, and calculates the relative position by using the position estimating line segment which is an approximate straight line of the turning track. That is, the calculation method is a simple calculation method. Accordingly, the electronic control unit is able to simply obtain the relative position, and thus, it is possible to further reduce the load needed in the calculation of the electronic control unit.

In the driving assistance apparatus according to the aspect of the disclosure, the motion indicator may include a plurality of indication components arranged along the virtual straight line, and the head-up display device may be configured to display the indication components in the virtual display area in order from the indication component positioned on a side opposite to the tip end.

When the disclosure is implemented in this aspect, the motion indicator moves such that the tip end thereof approaches the particular object along the virtual straight line with lapse of time, and thus, the occupant more reliably recognizes the motion indicator. Accordingly, the occupant who recognizes the motion indicator is able to more reliably recognize the particular object.

In the driving assistance apparatus according to the aspect of the disclosure, the motion indicator may be displayed such that dimensions of the indication components in a direction perpendicular to the virtual straight line decrease in order from the indication component positioned on a side opposite to the tip end.

When the disclosure is implemented in this aspect, the overall shape of the motion indicator is a shape of which the width becomes narrow toward the particular object. Accordingly, the occupant who recognizes the motion indicator is able to more reliably recognize the particular object.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 20A is a schematic diagram showing a motion indicator of a fourth modification example of the disclosure;

FIG. 20B is a schematic diagram showing the motion indicator of the fourth modification example of the disclosure;

FIG. 20C is a schematic diagram showing the motion indicator of the fourth modification example of the disclosure; and FIG. 21 is a schematic diagram showing a virtual display area and an indicator projected by a head-up display device of the related art.

DETAILED DESCRIPTION OF EMBODIMENTS

Hereinafter, a vehicle (automobile) 10 having a driving assistance apparatus 20 for a vehicle according to an embodiment of the present disclosure mounted thereon will be described with reference the accompanying drawings.

Figure 2:
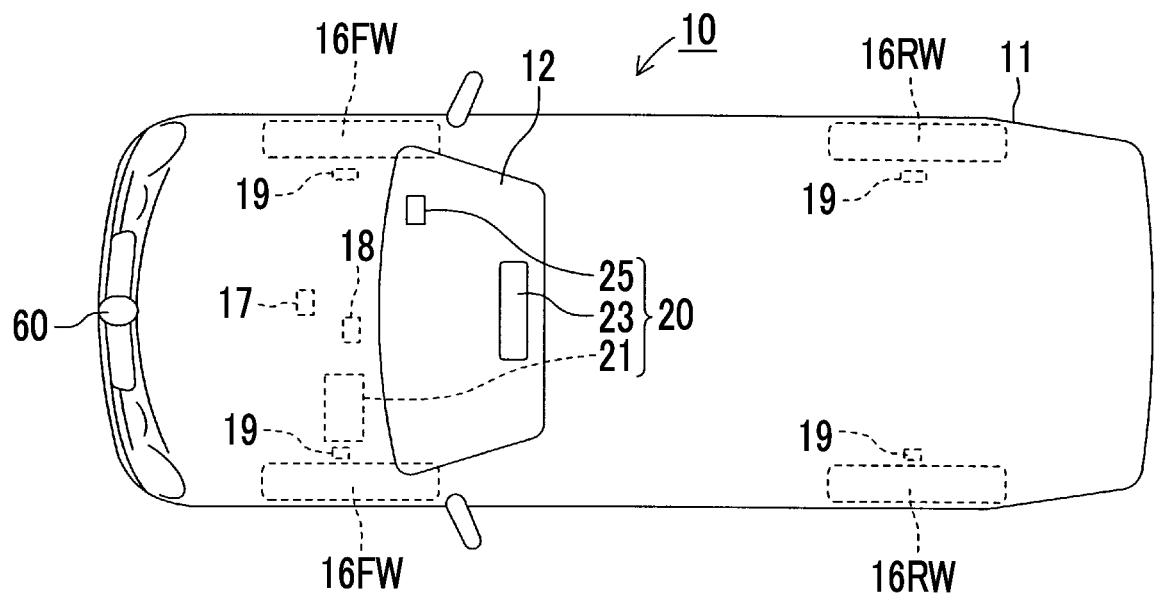
FIG. 2 is a plan view of the vehicle according to the embodiment of the disclosure.
Figure 3:
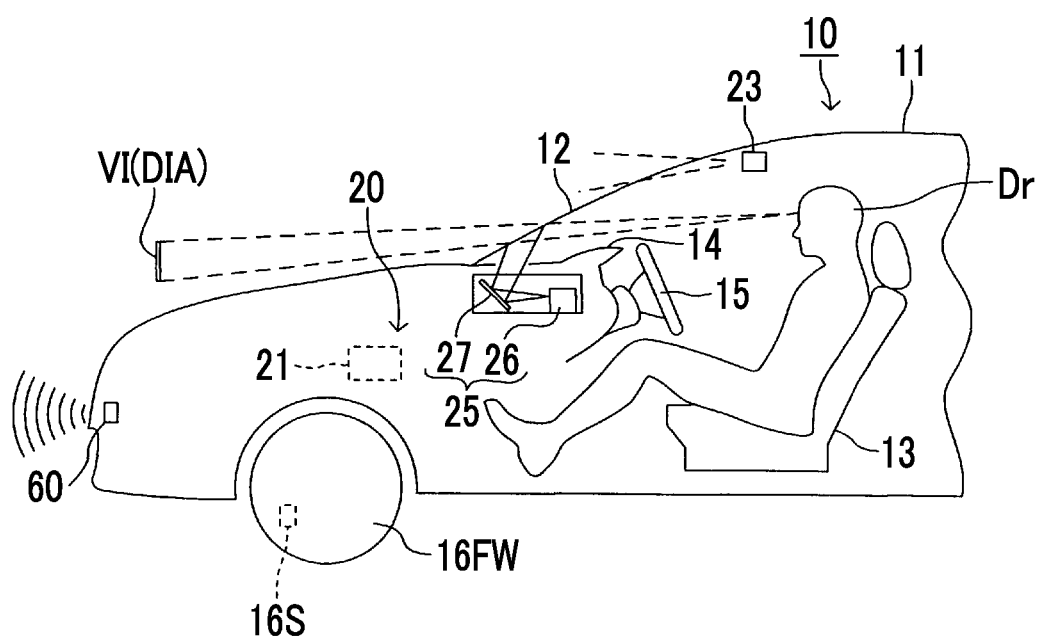
FIG. 3 is a schematic longitudinal side view of the front half of the vehicle according to the embodiment of the disclosure.

As shown in FIGS. 2, 3, 6, 8, and 10, a windshield 12 made of a transparent material (for example, glass or resin) is fixed to a vehicle body 11 of the vehicle 10. As shown in FIG. 3, two seats are provided on the front side in the cabin space of the vehicle 10 so as to be arranged on the right and left sides (one is illustrated in FIG. 3). The right seat is a driver seat 13. A driver Dr is able to be seated on the driver seat 13. The driver Dr seated on the driver seat 13 is able to visually perceive a scene (hereinafter, referred to as a front scene) in front of the windshield 12 through the windshield 12.

A dashboard 14 is fixed to the front side in the vehicle cabin. A steering wheel 15 is rotatably supported by the right side part of the dashboard 14. The steering wheel 15 is located directly ahead of the driver seat 13. As shown in FIG. 2, the vehicle 10 includes two front wheels 16FW and two rear wheels 16RW. As shown in FIG. 3, the vehicle 10 includes four wheel speed sensors 16S that detect rotational speeds of the front wheels 16FW and the rear wheels 16RW (the wheel speed sensor 16S on the front wheel 16FW is illustrated in FIG. 3). As is well known, when the driver Dr rotates the steering wheel 15, the steering angles of the right and left front wheels 16FW are changed. As shown in FIG. 2, a yaw-rate sensor 17 that detects the yaw rate of the vehicle 10 is provided at the vehicle 10.

The vehicle 10 includes an alarm device 18 and four brake devices 19. The brake devices 19 are connected to brake actuators (not shown). The wheel speed sensors 16S, the yaw-rate sensor 17, the alarm device 18, and the brake actuators are connected to an ECU 21 to be described below. The wheel speed sensors 16S and the yaw-rate sensor 17 function as a turning state quantity detection device. Further, the wheel speed sensors 16S functions as a vehicle speed detection device.

When the ECU 21 determines that a predetermined condition to be described below is satisfied, the alarm device 18 generates an alarm sound according to a command from the ECU 21.

As is well known, when the driver Dr steps on a brake pedal of the vehicle 10, the brake actuators linked to the brake pedal are activated. As a result, the brake devices 19 apply braking force to the front wheels 16FW and the rear wheels 16RW. Even when the driver Dr does not step on the brake pedal, when the ECU 21 determines that a predetermined condition to be described below is satisfied, since the ECU 21 transmits an activation signal to the brake actuators, the brake devices 19 apply the braking force to the front wheels 16FW and the rear wheels 16RW.

Next, the detailed structure and function of the driving assistance apparatus 20 will be described. As shown in FIGS. 2 and 3, the driving assistance apparatus 20 of the present embodiment includes, as major components, the ECU 21, a camera 23, and an HUD 25. The camera 23 functions as an imaging device.

The ECU 21 is short for electronic control unit. The ECU 21 includes a microcomputer including "a CPU, a ROM, a RAM, a backup RAM, an interface, and the like" which are connected to each other through a bus. Data items such as a program to be executed by the CPU, a lookup table (map), and a constant are stored in the ROM in advance. The RAM temporarily retains data according to an instruction of the CPU. The backup RAM also retains data when an ignition key switch (or a ready switch for changing the state of the vehicle 10 to a travelable state) of the vehicle 10 is positioned in an OFF position, in addition to when the ignition key switch is positioned in an ON position. The interface includes an AD converter. The CPU realizes various functions to be described below by executing a program stored in a memory (ROM).

The camera 23 connected to the ECU 21 is fixed to an upper end on the inner surface of the windshield 12. The camera 23 includes a pair of right and left imaging elements and two lenses that are positioned directly ahead of the right and left imaging elements. That is, the camera 23 is a stereo camera. The imaging elements of the camera 23 capture imaging light flux (that is, subject image) which is natural light, which is reflected rearwards by an obstacle positioned in front of the windshield 12 and passes through the windshield 12 and the lenses. That is, the camera 23 captures the front scene, which is capable of being visually perceived by the driver Dr seated on the driver seat 13 through the windshield 12.

Data items captured by the imaging elements of the camera 23 are repeatedly transmitted to the ECU 21 from the imaging elements at predetermined time intervals. The memory of the ECU 21 stores an image database including image data items representing various subjects. An image data group representing persons and various objects (for example, bicycles, vehicles, and road signs) is included in the image database. The ECU 21 determines whether or not image data matching image data included in the image database is included in the captured data by performing pattern matching using the captured data received from the camera 23 and the image database. That is, the ECU 21 may specify the category of the subject included in the captured data by using the image database.

A part of the image data group included in the image database is image data representing a "particular object". In the present embodiment, the person (pedestrian) and the bicycle are the particular objects. The particular objects are not limited to the person (pedestrian) and the bicycle. For example, the particular object may include animals (for example, dogs and cats). Thus, when the ECU 21 determines that the subject included in the captured data matches the image data representing the particular object by performing the pattern matching, the ECU 21 recognizes that the subject is the particular object.

The camera 23 is the stereo camera. Accordingly, the ECU 21 may calculate a distance between the camera 23 and the subject captured by the camera 23 based on the captured data received from the camera 23.

As shown in FIGS. 2 and 3, a recess is formed in a right side part on the top surface of the dashboard 14, and the HUD 25 is provided in the recess. The HUD 25 includes a projector unit 26 and a concave mirror 27.

Projection data items including various characters and icons (figures) are stored in the memory of the ECU 21. The projector unit 26 may project various kinds of images by reading the projection data from the memory of the ECU 21. The projector unit 26 that reads the projection data projects the image in front of the driver. The image projected by the projector unit 26 is reflected upwards by the concave mirror 27, and is further reflected rearwards by a rear surface of the windshield 12. Thus, when an intermediate position between both eyes of the driver Dr seated on the driver seat 13 is positioned in a predetermined eyeball reference position Pe set in the cabin space of the vehicle 10 shown in FIG. 4, the image which is projected by the projector unit 26 and is reflected rearwards by the windshield 12 is incident on the eyes of the driver Dr. By doing this, the driver Dr recognizes the projected image as a virtual image VI positioned in the front by a predetermined distance (for example, 2.7 m) from the windshield 12, as shown in FIG. 3. In other words, the driver Dr visually perceives the virtual image VI. As shown in FIGS. 3, 6 to 8, and 10, the virtual image VI includes a virtual display area DIA which is a planar virtual area perpendicular to a horizontal straight line that extends in the front-rear direction. In other words, the driver Dr recognizes that the virtual image VI is formed in the virtual display area DIA. The virtual display area DIA has a horizontally long rectangle (which has, for example, a vertical length of 15 cm and a horizontal length of 60 cm).

Figure 4:
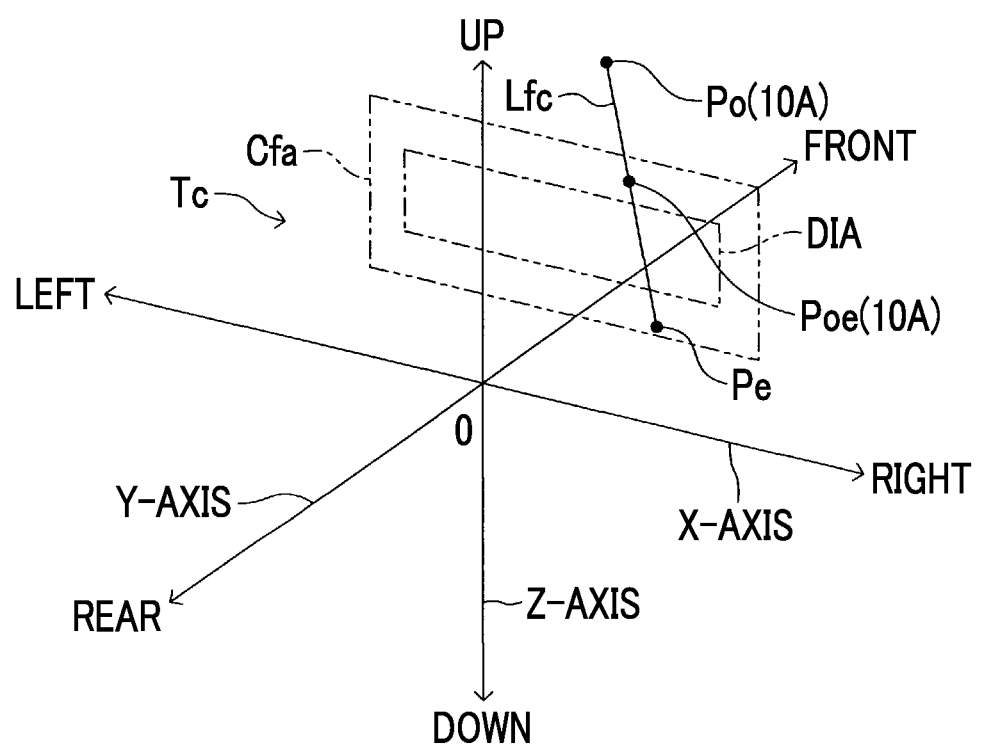
FIG. 4 is a diagram showing a three-dimensional coordinate system set on the vehicle according to the embodiment of the disclosure and the points in the three-dimensional coordinate system.

Information regarding the "eyeball reference position Pe" is recorded in the memory of the ECU 21. As shown in FIG. 4, the relative position of the eyeball reference position Pe relative to the vehicle 10 is a particular point. The eyeball reference position Pe is a position in a three-dimensional coordinate system Tc which is a virtual coordinate system having the X-axis (the axis of the vehicle 10 in the right-left direction), the Y-axis (the axis of the vehicle 10 in the front-rear direction), and the Z-axis (the axis of the vehicle 10 in the upper-lower direction). That is, the eyeball reference position Pe is defined by three positions including an X-axis direction position, a Y-axis direction position, and a Z-axis direction position. The origin (0) of the three-dimensional coordinate system Tc matches a predetermined position (for example, the central positions of the vehicle 10 in three-dimensional directions) of the vehicle 10. The eyeball reference position Pe is set based on an intermediate position between both eyes of an occupant having a certain particular physique when the occupant is seated on the driver seat 13. Thus, it is preferable that the eyeball reference position Pe is set based on the positions of the eyeballs of an occupant having an average physique when the occupant is seated on the driver seat 13. Even when the intermediate position between both eyes of the driver Dr is slightly deviated from the eyeball reference position Pe in the X-axis direction, the Y-axis direction, and/or the Z-axis direction, the driver Dr may recognize (visually perceive) the virtual image VI in the virtual display area DIA.

A combiner (reflection unit (not shown)) may be provided directly behind the windshield 12. In this case, the projected image which is projected by the projector unit 26 and is reflected upwards by the concave mirror 27 is reflected rearwards by the combiner. By doing this, the projected image which is projected by the projector unit 26 and is reflected rearwards by the combiner is incident on the eyes of the driver Dr seated on the driver seat 13, and thus, the driver Dr recognizes that the projected image is the virtual image VI positioned in the virtual display area DIA.

Figure 6:
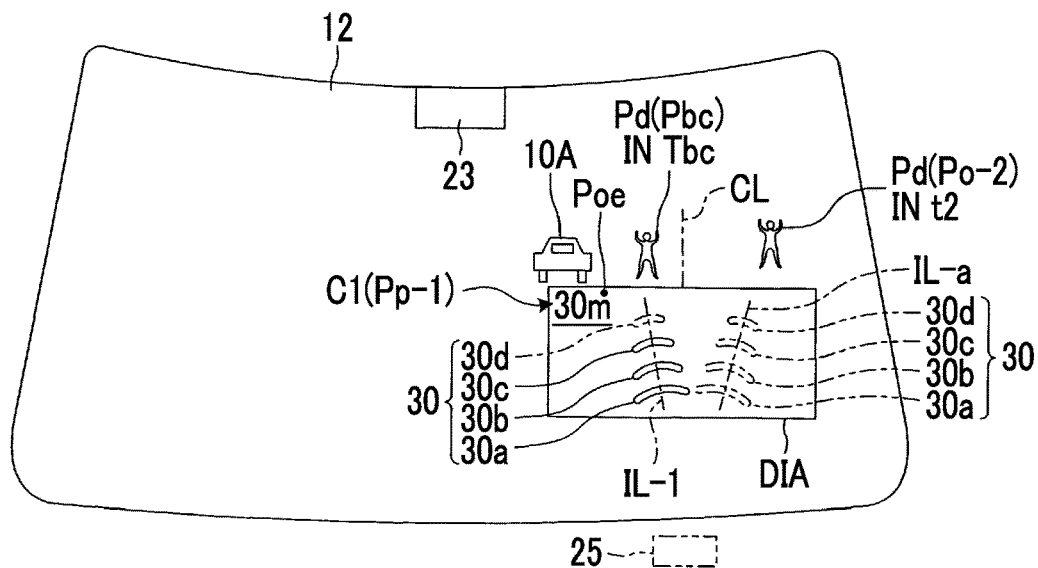
FIG. 6 is a diagram showing a windshield and a virtual display area when the vehicle according to the embodiment of the disclosure travels along the road of FIG. 1.

For example, as shown in FIG. 6, when a vehicle 10A different from the vehicle 10 is positioned in front of the vehicle 10 and the camera 23 captures the vehicle 10A, the captured data is transmitted to the ECU 21 from the camera 23. By doing this, the ECU 21 performs the pattern matching, and thus, the ECU recognizes that image data representing the vehicle 10A is included in the captured data and calculates an inter-vehicle distance (m) which is a distance between the camera 23 and the vehicle 10A. By doing this, the ECU 21 causes the projector unit 26 to read an image (projection data) corresponding to a number representing the calculated inter-vehicle distance (for example, 30 m) from the memory by controlling the projector unit 26. By doing this, since the projector unit 26 projects the image (number C1), the driver Dr recognizes the virtual image VI representing the number C1 in the virtual display area DIA.

The position of the virtual image VI (number C1) in the virtual display area DIA is determined by a predetermined projection position calculating method of which the outline is shown in FIG. 4 and which will be described below. In other words, a relative positional relationship between the virtual image VI visually perceived by the driver Dr and the obstacle positioned in front of the vehicle 10 is determined by the projection position calculating method.

Initially, the ECU 21 calculates an object position Po which is the relative position of the vehicle 10A relative to the eyeball reference position Pe based on the captured data received from the camera 23. The object position Po is also a position in the three-dimensional coordinate system Tc. In the present embodiment, the object position Po is defined by the central position of the vehicle 10A in the right-left direction, the central position of this vehicle in the front-rear direction, and the central position of this vehicle in the up-down direction.

The ECU 21 that calculates the object position Po of the vehicle 10A calculates a display position calculating straight line Lfc which connects the eyeball reference position Pe and the object position Po and is positioned in the three-dimensional coordinate system Tc. The ECU 21 obtains an object estimation position Poe which is the intersection of the display position calculating straight line Lfc and a position estimating plane Cfa that is a virtual plane which is positioned on the same plane as that of the virtual display area DIA and is wider than the virtual display area DIA. When the intermediate position between both eyes of the driver Dr matches the eyeball reference position Pe (or when the intermediate position is slightly deviated from the eyeball reference position), the object estimation position Poe is the position of the vehicle 10A on the position estimating plane Cfa which is visually perceived by the driver Dr when the driver Dr recognizes the virtual display area DIA.

The ECU 21 causes the projector unit 26 to project the image (representing the number C1) by controlling the projector unit 26. More specifically, the CU 21 controls the projector unit 26 such that the virtual image VI (number C1) is positioned in the vicinity of the object estimation position Poe (vehicle 10A) on the position estimating plane Cfa. Thus, as shown in FIG. 6, the driver Dr who recognizes the virtual display area DIA recognizes that the number C1 (virtual image VI) projected by the projector unit 26 is displayed in a projection position Pp-1 in the vicinity of the vehicle 10A. Accordingly, the driver Dr who recognizes the virtual display area DIA is able to reliably understand the inter-vehicle distance between the vehicle 10 and the vehicle 10A.

Figure 7A:
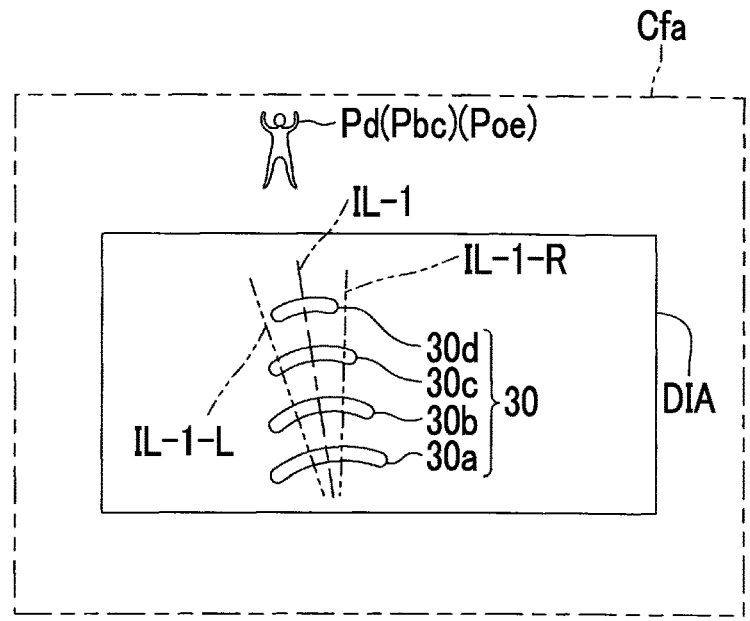
FIG. 7A is an enlarged view of a part of FIG. 6.
Figure 7B:
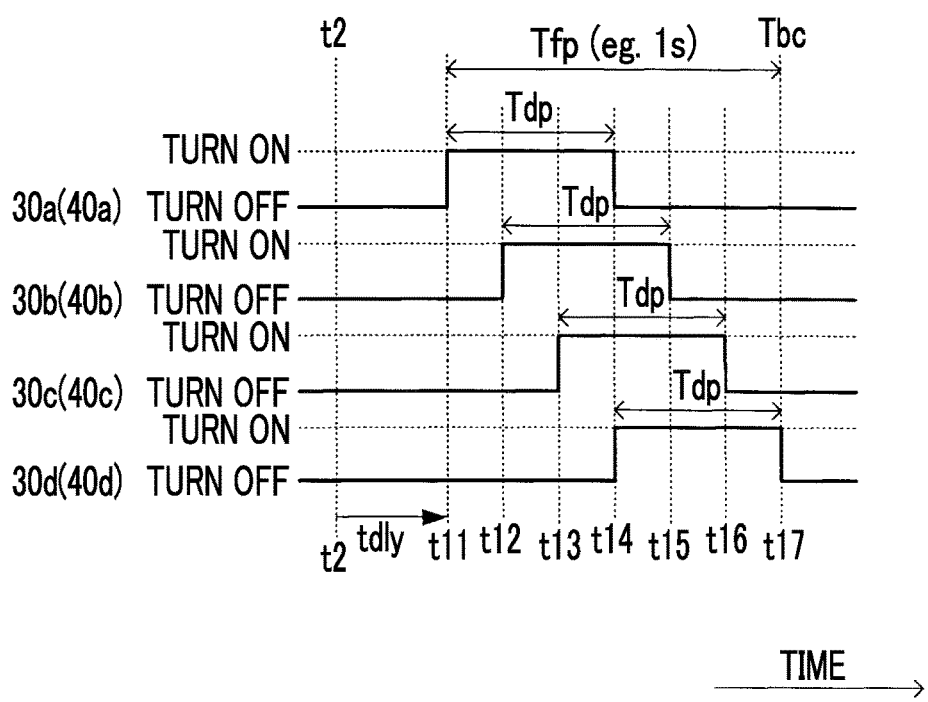
FIG. 7B is a time chart showing a display timing of a motion indicator.
Figure 8:
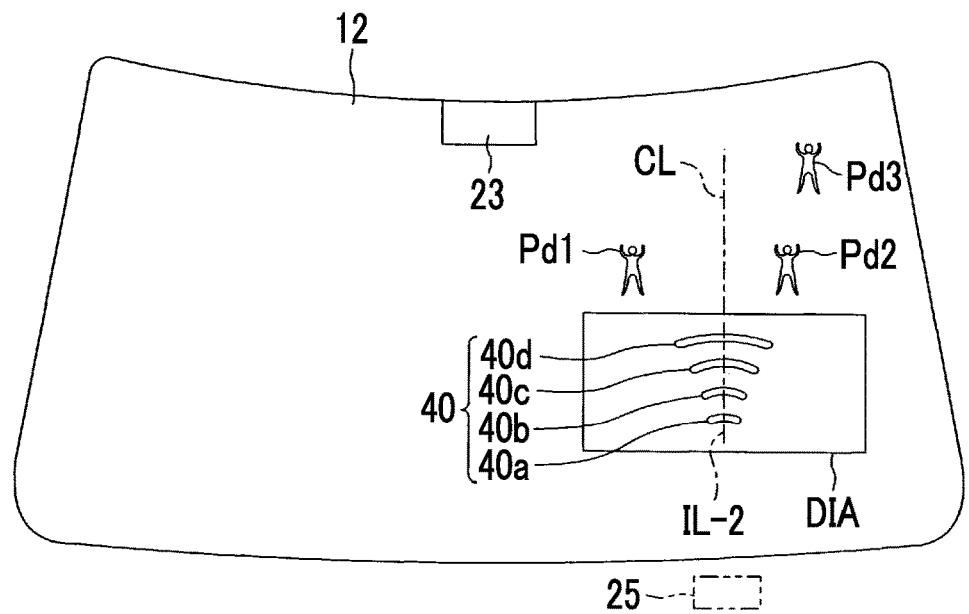
FIG. 8 is the same diagram as FIG. 6 when there is a plurality of pedestrians in front of the vehicle according to the embodiment of the disclosure.
Figure 9:
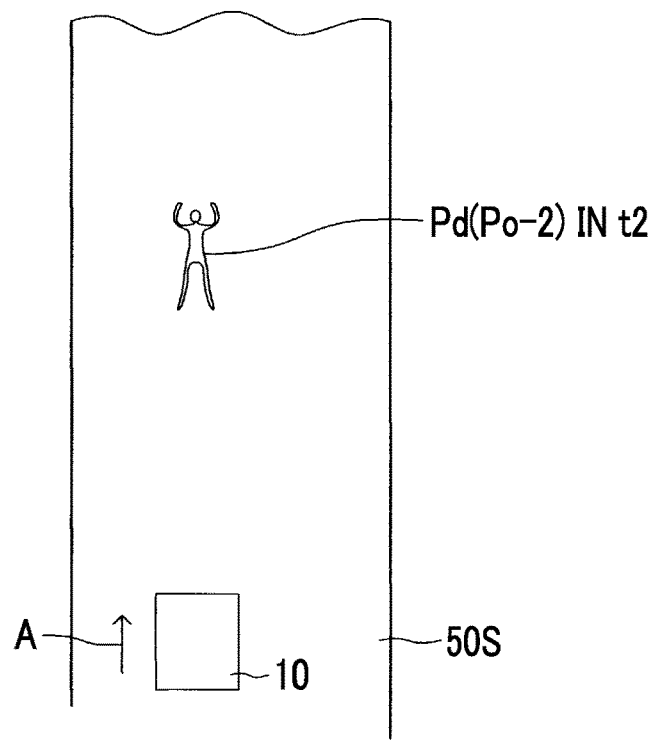
FIG. 9 is a plan view showing a case where the vehicle according to the embodiment of the disclosure travels on an almost straight road.
Figure 10:
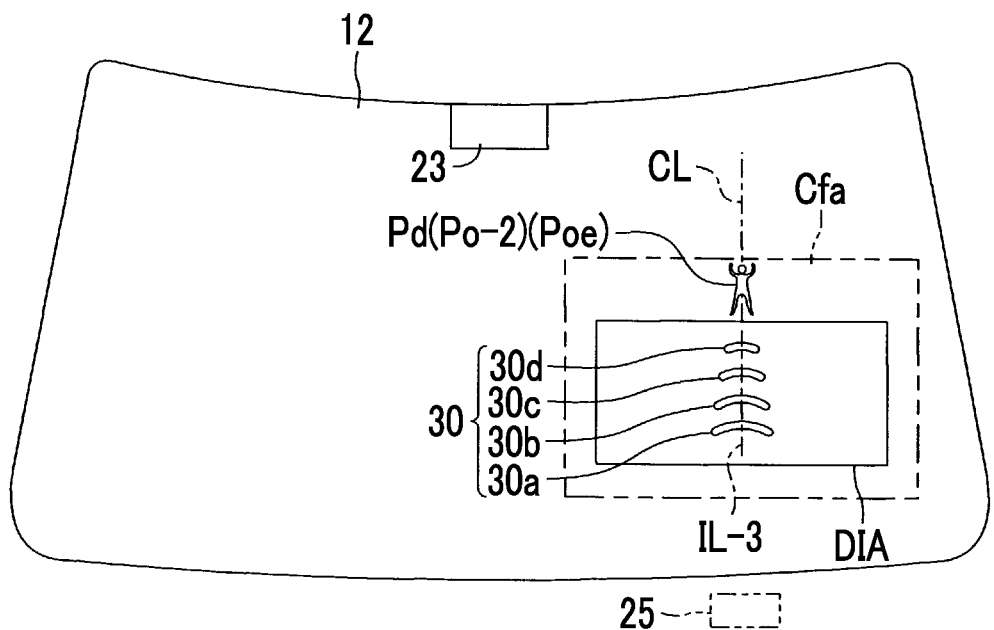
FIG. 10 is the same diagram as FIG. 6 when the vehicle according to the embodiment of the disclosure travels along the road of FIG. 9.

When the ECU 21 determines that the subject included in the captured data transmitted from the camera 23 matches the image data representing the particular object, the projector unit 26 projects a motion indicator 30 shown in FIGS. 6, 7, and 10 or motion indicator 40 shown in FIG. 8. Hereinafter, a specific projection method of the motion indicator 30 or the motion indicator 40 by the projector unit 26 when the vehicle 10 travels in the direction of an arrow A along a road 50C shown in FIG. 1 or a road 50S shown in FIG. 9 will be described by primarily referring to the flowcharts of FIGS. 11 to 16. As will be described below, when a virtual image of the motion indicator is formed in the virtual display area DIA, the driver Dr recognizes that the motion indicator 30 or the motion indicator 40 is an indicator which moves along a predetermined straight direction (virtual straight lines IL-1, IL-2, IL-3).

Figure 11:
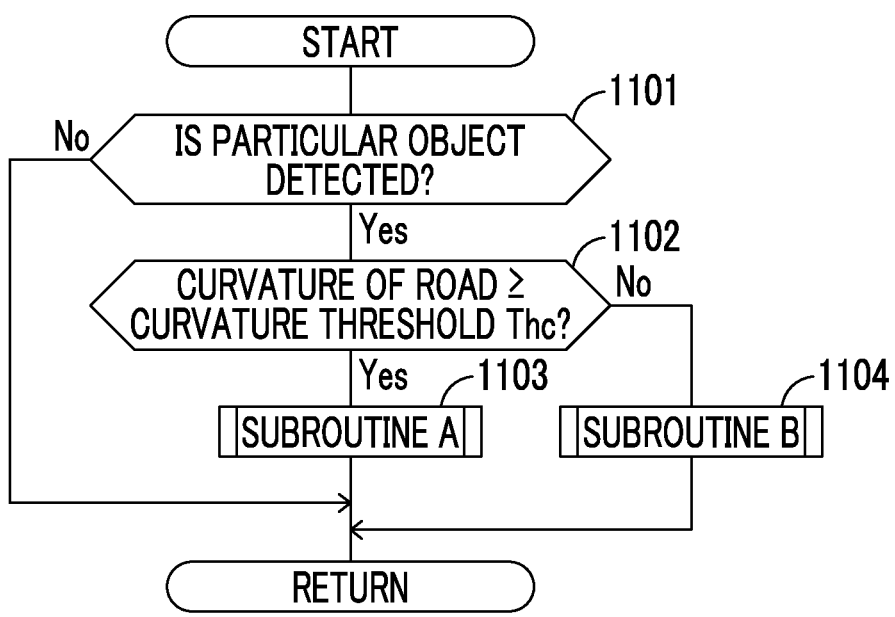
FIG. 11 is a flowchart showing a process performed by an ECU according to the embodiment of the disclosure.

When an ignition SW of the vehicle 10 switches from OFF to ON by operating the ignition key (not shown), the ECU 21 repeatedly performs a routine shown in the flowchart of FIG. 11 whenever a predetermined time elapses.

The ECU 21 determines whether or not the image data representing the particular object is included in the captured data of the camera 23 in step (hereinafter, step is abbreviated to S) 1101. When the camera 23 captures the particular object (for example, a pedestrian Pd) positioned in front of the vehicle 10, the ECU 21 determines that the determination result in S1101 is Yes, and proceeds to S1102. Hereinafter, it is assumed that the particular object is the pedestrian Pd in order to facilitate understanding, and the description is continued.

The ECU 21 that proceeds to S1102 calculates the curvature of the road along which the vehicle 10 travels in plan view. More specifically, the ECU 21 obtains the turning radius of the vehicle 10 based on the value of the yaw rate detected by the yaw-rate sensor 17 of the vehicle 10 and the vehicle speed detected by the wheel speed sensors 16S between a current time and a time which is earlier than the current time by a predetermined time, and calculates the curvature of the road based on the turning radius. In S1102, the ECU 21 determines whether or not the calculated curvature of the road is equal to or greater than a curvature threshold Thc recorded in the memory of the ECU 21. For example, the curvature threshold Thc may be "1/100 (m)".

Figure 1:
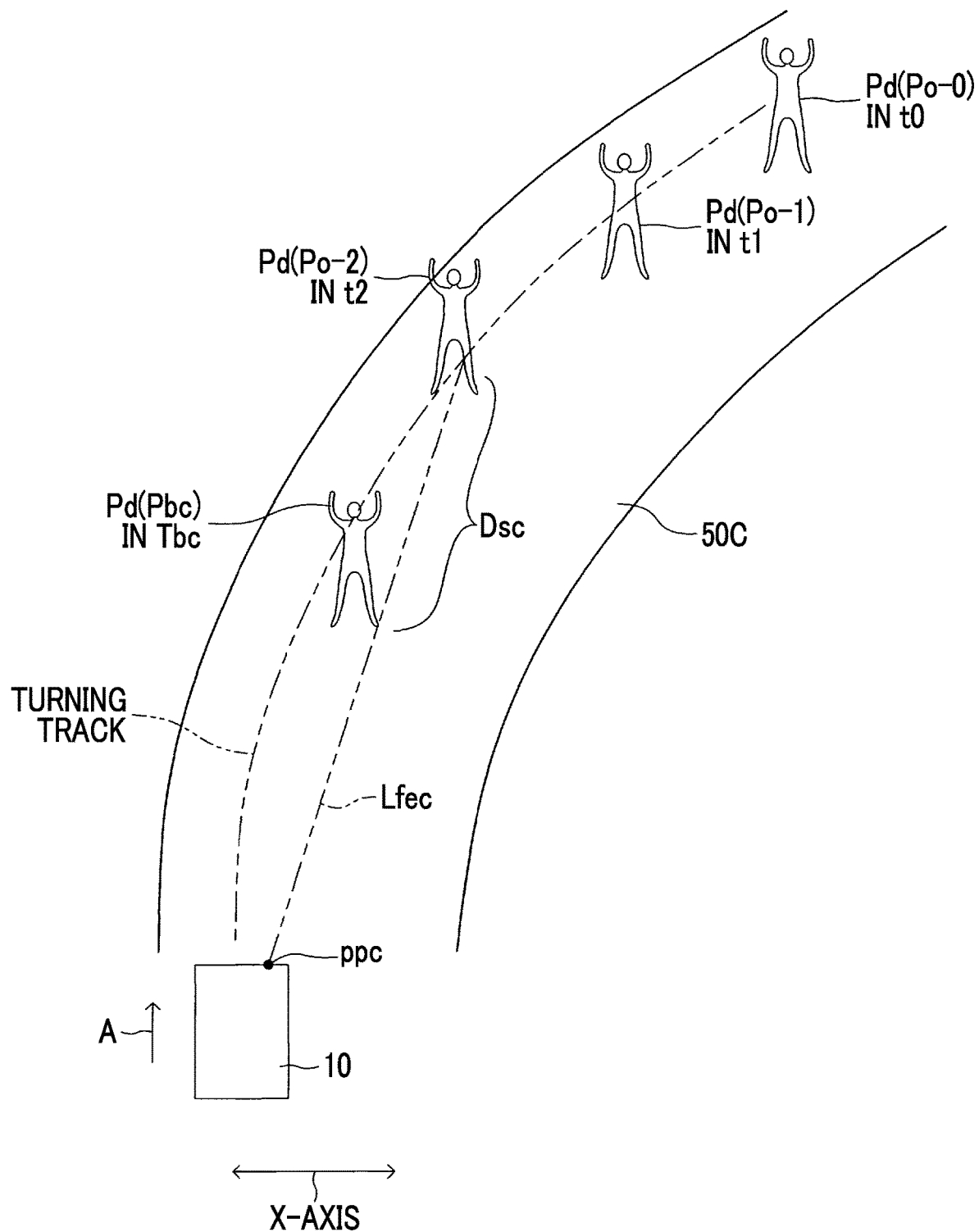
FIG. 1 is a plan view showing a case where a vehicle having a driving assistance apparatus according to an embodiment of the disclosure mounted thereon travels on a road of which curvature is equal to or greater than a predetermined curvature threshold.
Figure 12:
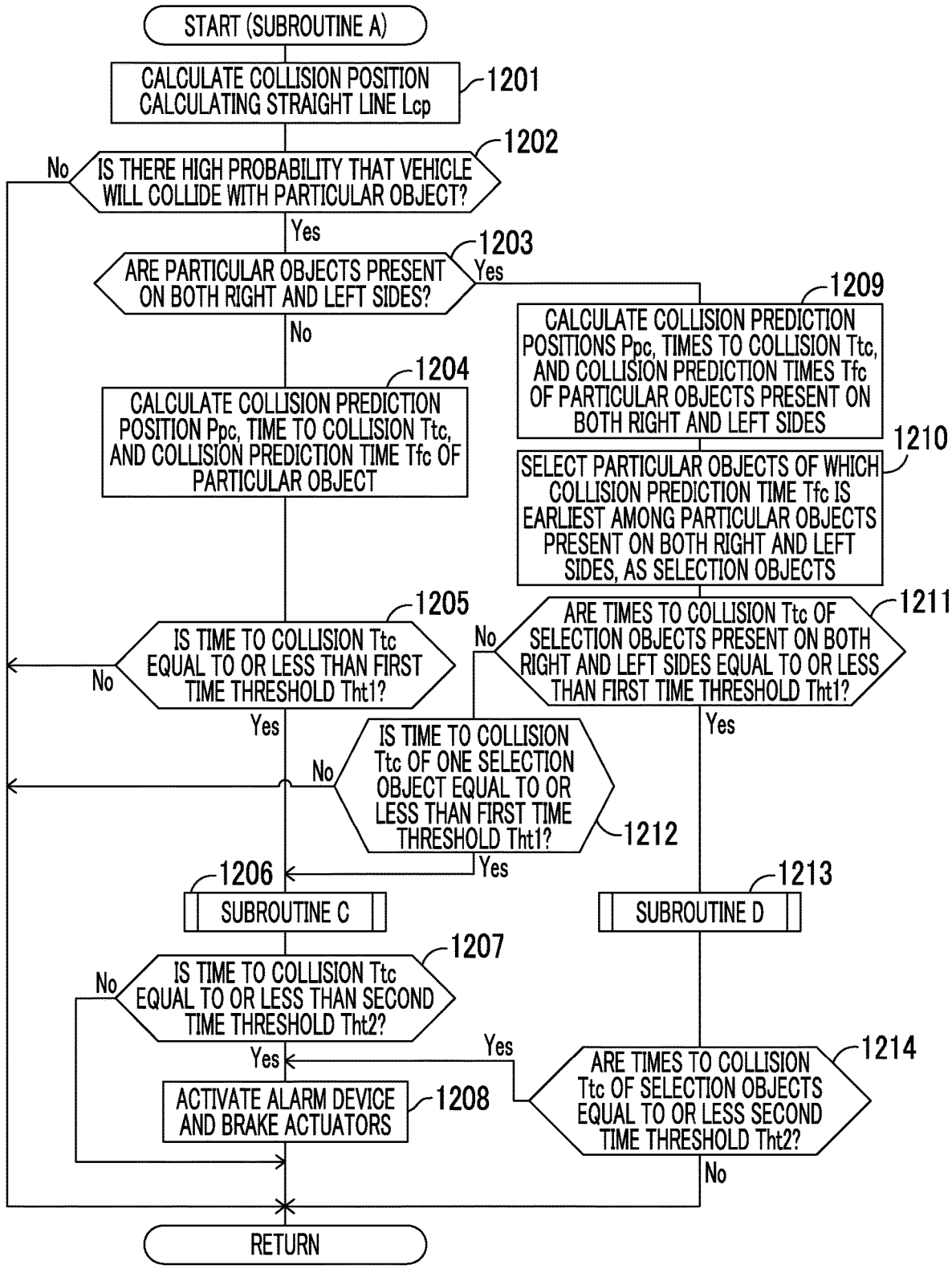
FIG. 12 is a flowchart showing a subroutine A performed by the ECU according to the embodiment of the disclosure.

When the vehicle 10 travels along the road 50C (that is, a road of which the curvature of the road 50C is equal to or greater than the curvature threshold Thc) of FIG. 1, the ECU 21 determines that the determination result in S1102 is Yes, proceeds to S1103, and proceeds to a subroutine A shown in FIG. 12.

In S1201, the ECU 21 that proceeds to the subroutine A performs the following calculation process which is known.

As shown in FIG. 1, one pedestrian Pd is positioned on the road 50C while this pedestrian substantially remains at rest.

Time t2 represented in FIG. 1 and the like is a current time, time t1 is a time which is earlier than time t2 by a predetermined time (for example, 100 milliseconds ago), and time t0 is a time which is earlier than time t1 by the predetermined time. A relative positional relationship (that is, a relative positional relationship between the X-axis direction and the Y-axis direction) between the vehicle 10 and the pedestrian Pd in plan view in times t0, t1, t2 is as shown in FIG. 1. The ECU 21 of the vehicle 10 calculates relative positions (object positions Po-0, Po-1, Po-2) of the pedestrian Pd relative to the vehicle 10 in times t0, t1, t2 based on captured data items captured by the camera 23 in times t0, t1, t2.

Figure 5:
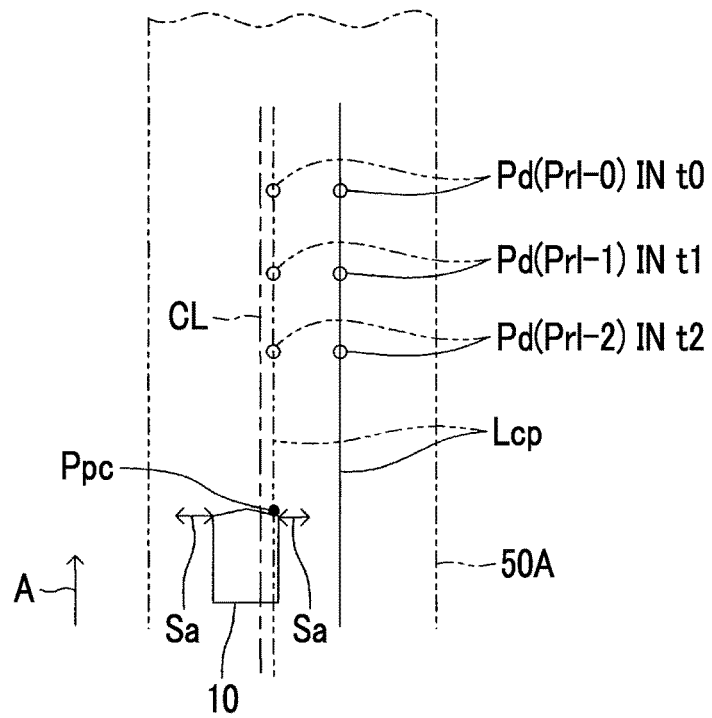
FIG. 5 is a diagram showing a virtual straight road, and a vehicle and a pedestrian positioned on the virtual straight road.

As shown in FIG. 5, the ECU 21 calculates a virtual relative position Prl of the pedestrian Pd relative to the vehicle 10 on a virtual straight road 50A having a straight shape when it is assumed that the road 50C is the virtual straight road 50A. More specifically, the ECU 21 calculates virtual relative positions Prl-0, Prl-1, Prl-2 of the pedestrian Pd relative to the vehicle 10 in times t0, t1, t2 based on the curvature (the turning track of the vehicle 10) of the road 50C and the object positions Po-0, Po-1, Po-2. The ECU 21 calculates a collision position calculating straight line Lcp which is a straight line passing through the virtual relative positions Prl-0, Prl-1, Prl-2.

The ECU 21 that ends the process of S1201 proceeds to S1202. When the collision position calculating straight line Lcp overlaps the vehicle 10 (see a point Ppc and a collision position calculating straight line Lcp as a virtual line represented by a dashed double-dotted line in FIG. 5), the ECU 21 determines that "there is a relatively high probability that the vehicle 10 will collide with the pedestrian Pd". An area between a position which is the right end at the front end of the vehicle 10 and a position which is distant rightwards from the right end at the front end thereof by a predetermined distance (for example, 1.5 m) and an area between a position which is the left end at the front end of the vehicle 10 and a position which is distant leftwards from the left end at the front end thereof by a predetermined distance (for example, 1.5 m) are referred to as side areas Sa in the present specification. Even when the collision position calculating straight line Lcp overlaps the side area Sa (not shown), the ECU 21 determines that "there is a relatively high probability that the vehicle 10 will collide with the pedestrian Pd". Meanwhile, when the collision position calculating straight line Lcp does not overlap the vehicle 10 and the side area Sa (see a collision position calculating straight line Lcp represented by a solid line in FIG. 5), the ECU 21 determines that "there is a relatively low probability that the vehicle 10 will collide with the pedestrian Pd".

When the ECU 21 determines that the determination result in S1202 is Yes, the ECU 21 determines whether or not there are the particular objects (pedestrians Pd) on both right and left sides of a central straight line CL (see FIGS. 5, 6, and 8) which passes through the center of the driver seat 13 of the vehicle 10 and extends in the Y-axis direction (front-rear direction) or whether or not there is the particular object (pedestrian Pd) on any one of both right and left sides of the central straight line CL in the current time (time t2) based on the captured data. In the example of (FIG. 1 and) FIG. 5, there is one pedestrian Pd on one side (the right side in this case) of the right and left sides of the central straight line CL. Thus, the ECU 21 determines that the determination result in S1203 is No, and proceeds to S1204.

The ECU 21 that proceeds to S1204 obtains, as a collision prediction position Ppc, a contact position (a position in the X-axis direction and the Y-axis direction) between the collision position calculating straight line Lcp and the front end surface of the vehicle 10 and an intersection position (a position in the X-axis direction and the Y-axis direction) of the side area Sa and the collision position calculating straight line Lcp. When the driver Dr does not step on the brake pedal or does not rotate the steering wheel 15, the collision prediction position Ppc is the position on the vehicle 10 in which it is predicted that the pedestrian Pd will collide with or a position in which the pedestrian Pd will approach the vehicle 10 more than needs. The ECU 21 calculates a time (hereinafter, referred to as "time to collision Ttc") taken for the pedestrian Pd to reach the collision prediction position Ppc based on the virtual relative position Prl-2 (that is, the distance L between the vehicle 10 and the pedestrian Pd in time t2) on the virtual straight road 50A in time t2 (current time) and the vehicle speed V of the vehicle 10 detected by the wheel speed sensors 16S in time t2 (specifically, by dividing the distance L by the vehicle speed V). In addition, the ECU 21 calculates a collision prediction time Tfc from the current time (time t2) and the time to collision Ttc (specifically, by adding the time to collision Ttc to time t2). The collision prediction time Tfc is a time predicted that the pedestrian Pd will collide with the vehicle 10 or will approach the vehicle more than needs when the driver Dr does not step on the brake pedal or does not rotate the steering wheel 15 and the vehicle 10 continues traveling at the vehicle speed of the current time.

The ECU 21 that ends the process of S1204 proceeds to S1205, and determines whether or not the time to collision Ttc is equal to or less than a predetermined first time threshold Tht1 recorded in the memory of the ECU 21.

Figure 14:
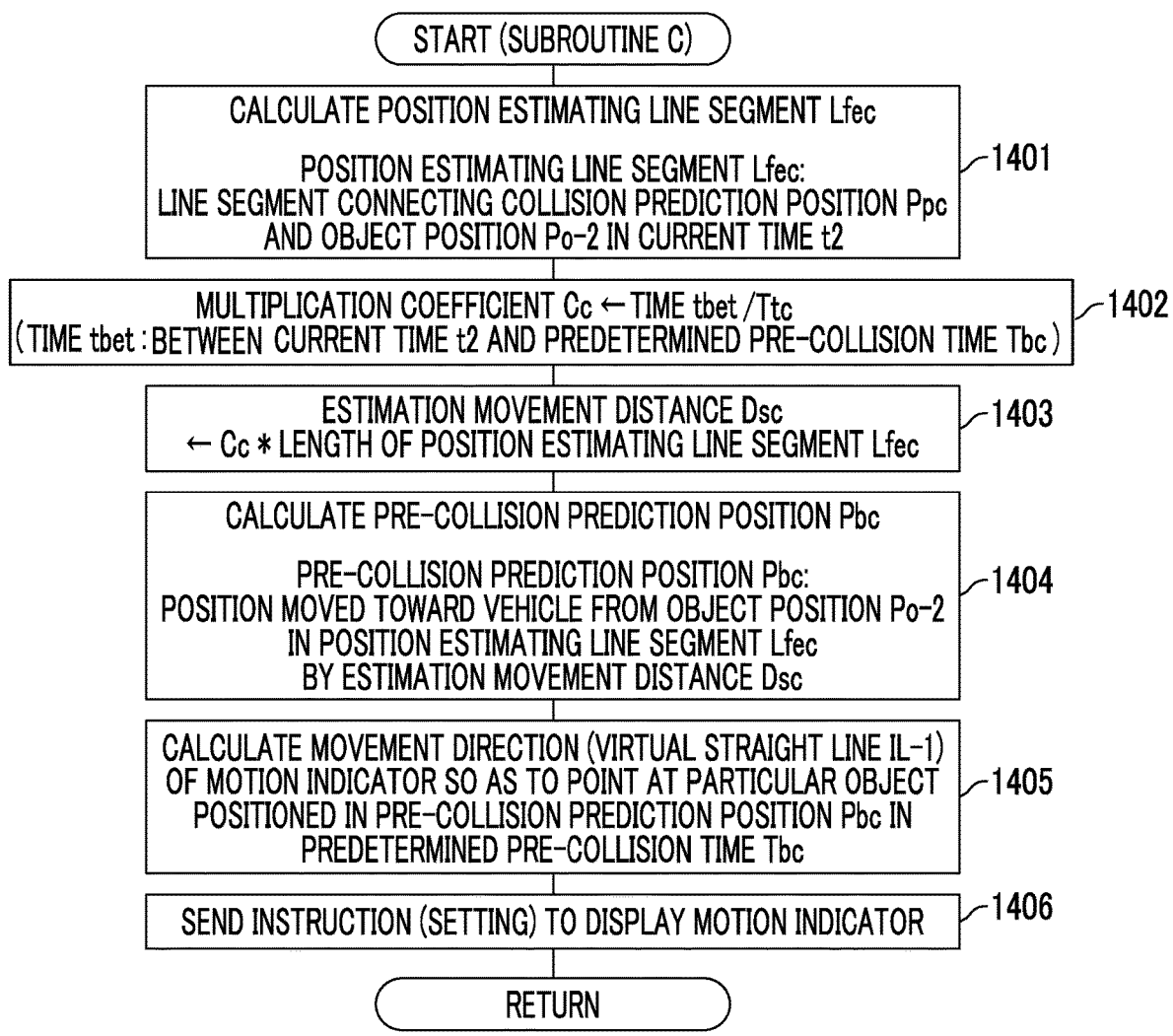
FIG. 14 is a flowchart showing a subroutine C performed by the ECU according to the embodiment of the disclosure.

When the ECU 21 determines that "the time to collision Ttc is equal to or less than the first time threshold Tht1" in S1205, the ECU 21 proceeds to S1206, and proceeds to a subroutine C shown in FIG. 14.

The ECU 21 that proceeds to the subroutine C performs the following process in S1401. That is, the ECU 21 calculates a position estimating line segment Lfec that connects the relative position Po-2 of the pedestrian Pd relative to the vehicle 10 in the current time (=time t2) and the collision prediction position Ppc, as shown in FIG. 1. The position estimating line segment Lfec is an approximate straight line of the turning track of the vehicle 10 between time t2 and the collision prediction time Tfc.

The ECU 21 that ends the process of S1401 proceeds to S1402, and obtains a multiplication coefficient Cc (=tbet/Ttc) by dividing time tbet between a predetermined pre-collision time Tbc, which is a predetermined time between the current time (=time t2) and the collision prediction time Tfc, and time t2 by the time to collision Ttc.

The ECU 21 proceeds to S1403, and obtains an estimation movement distance Dsc which is a value acquired by multiplying "the length of the position estimating line segment Lfec" by the multiplication coefficient Cc. The estimation movement distance Dsc is equivalent to a distance at which the vehicle 10 moves between the current time and the predetermined pre-collision time Tbc (that is, a time which is earlier than time t2 which is the current time by time tbet).

The ECU 21 proceeds to S1404, and obtains, as a pre-collision prediction position Pbc, a position which is positioned in the position estimating line segment Lfec and is moved to the vehicle 10 from the object position Po-2 by the estimation movement distance Dsc. The pre-collision prediction position Pbc is the relative position (estimation position) of the pedestrian Pd relative to the vehicle 10 in the predetermined pre-collision time Tbc.

The ECU 21 proceeds to S1405, and calculates the movement direction (a virtual straight line IL-1 which is an axis of the motion indicator 30) of the motion indicator 30 in the virtual display area DIA shown in FIGS. 6 and 7. That is, the ECU 21 obtains the object estimation position Poe which is the intersection of the position estimating plane Cfa and a straight line that connects the eyeball reference position Pe and the pre-collision prediction position Pbc by using the projection position calculating method (see FIG. 7A). The ECU 21 determines the position and slope (direction) of the virtual straight line IL-1 on the position estimating plane Cfa. More specifically, the ECU 21 determines the position and slope (direction) of the virtual straight line IL-1 such that the object estimation position Poe is positioned in the virtual straight line IL-1 (in an extension line of the virtual straight line IL-1) on the position estimating plane Cfa. As will be described below, the virtual straight line IL-1 is the movement direction of the motion indicator 30 in the virtual display area DIA. Here, the projector unit 26 does not project an image corresponding to the virtual straight line IL-1. Thus, the driver Dr who recognizes the virtual display area DIA is not able to recognize the virtual straight line IL-1.

The ECU 21 that ends the process of S1405 proceeds to S1406. The ECU controls the projector unit 26 to read the image representing the motion indicator 30 from the memory, and causes the projector unit 26 to project the image for a predetermined display time Tfp. That is, the ECU 21 calculates a display start time which is earlier than the predetermined pre-collision time Tbc by the display time Tfp, and sends an instruction to start the display of the motion indicator 30 in the display start time to the projector unit 26.

Incidentally, the motion indicator 30 includes four indication components 30a, 30b, 30c, 30d which are separated from one another and are positioned in the virtual straight line IL-1, as shown in FIGS. 6 and 7A. The indication components 30a, 30b, 30c, 30d have upwardly projected arc shapes. The dimensions of the indication components 30a, 30b, 30c, 30d in the direction perpendicular to the virtual straight line IL-1 gradually decrease in the order of the indication components 30a, 30b, 30c, 30d. That is, the overall motion indicator 30 has a shape of which the width becomes narrow toward the top.

The projector unit 26 causes projection timings of the indication components 30a, 30b, 30c, 30d to be different from one another. That is, the projector unit 26 projects the motion indicator 30 in the order of the indication components 30a, 30b, 30c, 30d, as shown in FIG. 7B. Thus, the driver Dr recognizes that the motion indicator 30 (indication components 30a, 30b, 30c, 30d) is moving from bottom to top in the virtual display area DIA.

Projection times during which the indication components 30a, 30b, 30c, 30d are projected by the projector unit 26 are the same as one another, and are a very short predetermined time (Tdp). When the projector unit 26 sequentially projects the indication components 30a, 30b, 30c, the projection times of the three indication components 30a, 30b, 30c slightly overlap one another (see from time t13 to time t14). Thus, the driver Dr temporarily recognizes the indication components 30a, 30b, 30c at the same time. When the predetermined time (Tdp) elapses from the projection start time (time t11) of the indication component 30a (in time t14), the projection of the indication component 30a performed by the projector unit 26 is ended, and the indication component 30d is projected by the projector unit 26. Accordingly, the driver Dr temporarily recognizes the three indication components 30b, 30c, 30d at the same time (see from time t14 to time t15). When the predetermined time (Tdp) elapses from the projection start time (time t12) of the indication component 30b (in time t15), since the projection of the indication component 30b performed by the projector unit 26 is ended, the driver Dr temporarily recognizes the two indication components 30c, 30d at the same time (see from time t15 to time t16). When the predetermined time (Tdp) elapses from the projection start time (time t13) of the indication component 30c (in time t16), since the projection of the indication component 30c performed by the projector unit 26 is ended, the driver Dr temporarily recognizes the one indication component 30d (see time t16 to time t17). When the predetermined time (Tdp) elapses from the projection start time (time t14) of the indication component 30d (in time t17), since the projection of the indication component 30d performed by the projector unit 26 is ended, the driver Dr is not able to recognize the motion indicator 30. When the projection times (Tdp) of the indication components 30a, 30b, 30c, 30d are 0.5 seconds, the display time Tfp which is a time taken from when the projection of the indication component 30a is started to when the projection of the indication component 30d is ended is about 1 second.

As a result, a time when the display time Tfp is ended matches the predetermined pre-collision time Tbc. As shown in FIGS. 6, 7A, and 7B, in the end time of the display time Tfp (the predetermined pre-collision time Tbc), the pedestrian Pd (pre-collision prediction position Pbc) is exactly positioned in the virtual straight line IL-1 (the extension line of the virtual straight line IL-1). Accordingly, the driver Dr recognizes that "the indication components 30a, 30b, 30c, 30d of the motion indicator 30 gradually approach the pedestrian Pd along the virtual straight line IL-1 and the pedestrian Pd is positioned in the movement direction (the virtual straight line IL-1) of the motion indicator 30 in the predetermined pre-collision time Tbc".

As stated above, in S1406, the ECU 21 calculates the display start time (in other words, time t11 after a delay time tdly elapses from the current time t2) which is earlier than the predetermined pre-collision time Tbc by the display time Tfp, and sends an instruction to start the display of the motion indicator 30 in the display start time (t11) to the projector unit 26. The ECU 21 that ends the process of S1406 ends the process of the subroutine C once.

The ECU 21 that ends the process of the subroutine C (S1206) proceeds to S1207 of the routine shown in FIG. 12, and determines whether or not the collision-taken time Ttc which is a time taken from the current time to the collision prediction time Tfc is equal to or less than a predetermined second time threshold Tht2 recorded in the memory of the ECU 21. The second time threshold Tht2 is shorter than the first time threshold Tht1.

The ECU 21 determines that the determination result in S1207 is Yes, proceeds to S1208, and activates the alarm device 18 and the brake actuators. Thus, the alarm device 18 provides the alarm sound to the driver Dr in order to attract the driver's attention, and the brake devices 19 automatically perform a braking operation.

When the ECU determines that the determination result in S1207 is No and ends the process of S1208, the ECU 21 ends the process of the flowcharts of FIG. 12 once.

When the ECU 21 determines that the determination result in S1202 or S1205 is No, the projector unit 26 does not need to project the motion indicator 30 in the current time. Thus, the ECU 21 ends the process of the flowchart shown in FIG. 12 once.

Since the motion indicator 30 which is projected in the process of the subroutine C and is recognized by the driver Dr in the virtual display area DIA irritates to the eyes of the driver Dr less than the indicator of the related art shown in FIG. 21, the motion indicator of the present embodiment is hard to give discomfort to the driver Dr. That is, the line of sight of the driver who recognizes the motion indicator 30 is naturally guided to the indication component 30d from the indication component 30a. Since the overall motion indicator 30 has the shape of which the width becomes narrow toward the top, the driver Dr is able to reliably recognize that the motion indicator 30 is pointing at the pedestrian Pd. Thus, the driver Dr who recognizes the motion indicator 30 is able to more reliably recognize that the pedestrian Pd is positioned in front of the vehicle 10 than when the driver recognizes the indicator of the related art shown in FIG. 21. Thus, the driver Dr may perform needed collision avoidance traveling in an early timing by stepping on the brake pedal and rotating the steering wheel 15.

As mentioned above, when the time to collision Ttc from the current time to the collision prediction time Tfc is equal to or less than the second time threshold Tht2, the ECU 21 generates the alarm sound by using the alarm device 18 and performs automatic braking by using the brake actuators. In other words, when the driver Dr does not perform the needed collision avoidance traveling before the time to collision Ttc is equal to or less than the second time threshold Tht2, the ECU 21 activates the alarm device 18 and the brake actuators. However, there is a higher possibility that the driver Dr who recognizes the motion indicator 30 displayed when the time to collision Ttc is equal to or less than the first time threshold Tht1 will perform the needed collision avoidance traveling in the early timing. In other words, there is a higher possibility that the driver Dr will perform the needed collision avoidance traveling before the time to collision Ttc is equal to or less than the second time threshold Tht2. Thus, since a possibility that the alarm sound will be generated by the alarm device 18 or the automatic braking will be performed by the brake actuators is further reduced, it is possible to further reduce the frequency at which the driver Dr feels strong discomfort by generating the alarm sound and/or by performing the automatic braking.

The motion indicator 30 is able to demonstrate the following remarkable actions and advantages. That is, when the vehicle 10 travels along the road 50C of which the curvature is equal to or greater than the curvature threshold Thc, the relative position of the particular object (pedestrian Pd) relative to the vehicle 10 in the X-axis direction is changed in proportion to each other with lapse of time, as shown in FIG. 1. Accordingly, for example, when the projector unit 26 starts the display of the motion indicator 30 that moves along a virtual straight line IL-a which extends toward the position (object position Po-2) of the pedestrian Pd in time t2, in time t2 which is a time earlier than the predetermined pre-collision time Tbc as represented by the virtual line (dashed double-dotted line) of FIG. 6, there are the following problems. That is, in this case, the driver Dr recognizes that the position shift amount of the position (pre-collision prediction position Pbc) of the pedestrian Pd shifted from the virtual straight line IL-a in the X-axis direction is greater than a predetermined value in the predetermined pre-collision time Tbc. Thus, in this case, there is a higher possibility that the driver Dr who visually perceives the pedestrian Pd and recognizes the virtual display area DIA (motion indicator 30) in the predetermined pre-collision time Tbc will feel strong discomfort.

In contrast, in the present embodiment, the projector unit 26 projects the motion indicator 30 such that the driver Dr recognizes that the pedestrian Pd (pre-collision prediction position Pbc) is positioned in (the extension line of) the virtual straight line IL-1 in the predetermined pre-collision time Tbc, as stated above. Accordingly, the driver Dr recognizes that there is no position shift amount of the position (pre-collision prediction position Pbc) of the pedestrian Pd shifted from the virtual straight line IL-1 in the X-axis direction in the predetermined pre-collision time Tbc. Thus, in this case, there is a lower possibility that the driver Dr who visually perceives the pedestrian Pd and recognizes the virtual display area DIA (motion indicator 30) will feel discomfort in the predetermined pre-collision time Tbc.

In S1401 to S1404 shown in FIG. 14, the ECU 21 does not calculate the pre-collision prediction position Pbc based on the turning track (the curvature of the road 50C) of the vehicle 10, and calculates the pre-collision prediction position Pbc by using the position estimating line segment Lfec which is the approximate straight line of the turning track. That is, the calculation method is a simple calculation method. Thus, the ECU 21 is able to simply obtain the pre-collision prediction position Pbc, and thus, it is possible to further reduce the load needed in the calculation of the ECU 21 when the pre-collision prediction position Pbc is obtained.

Meanwhile, as shown in FIG. 8, when there are at least one or more particular objects (pedestrians Pd1, Pd2, Pd3 in the example of FIG. 8) on both right and left sides of the central straight line CL, the ECU 21 determines that the determination result in S1203 of the routine shown in FIG. 12 is Yes, and proceeds to S1209. Hereinafter, it is assumed that the particular objects are the pedestrians Pd1, Pd2, Pd3, and the description is continued. In S1209, the ECU 21 calculates the collision prediction position Ppc, the time to collision Ttc, and the collision prediction time Tfc for each of the pedestrians Pd1, Pd2, Pd3 in the same manner as that in S1204.

The ECU 21 that ends the process of S1209 proceeds to S1210. Of the pedestrians who are positioned on the left side of the central straight line CL, the ECU selects one pedestrian of which the collision prediction time Tfc is the earliest, as a left selection object. Of the pedestrians who are positioned on the right side of the central straight line CL, the ECU selects one pedestrian of which the collision prediction time Tfc is the earliest, as a right selection object. In the example of FIG. 8, of the two pedestrians Pd2, Pd3 who are positioned on the right side of the central straight line CL, of which the collision prediction time Tfc reaches earlier, the pedestrian Pd2 is selected as the right selection object by the ECU 21. Meanwhile, since the pedestrian Pd1 is positioned on the left side of the central straight line CL, the ECU 21 selects the pedestrian Pd1 as the left selection object.

The ECU 21 ends the process of S1210, and proceeds to S1211. The ECU determines whether or not both the time to collision Ttc of which the left selection object (pedestrian Pd1 in this case) and the time to collision Ttc for the right selection object (pedestrian Pd2 in this case) are equal to or less than the first time threshold Tht1.

When the ECU determines that the determination result in S1211 is No, the ECU 21 proceeds to S1212. In S1212, the ECU 21 determines whether or not any one of the time to collision Ttc for the left selection object (pedestrian Pd1 in this case) and the time to collision Ttc for the right selection object (pedestrian Pd2 in this case) is equal to or less than the first time threshold Tht1. When the ECU 21 determines that the determination result in S1212 is yes, the ECU 21 proceeds to S1206 (subroutine C). That is, similarly to the case where the ECU determines that the determination result in S1205 is Yes, the projector unit needs to project the motion indicator 30 such that the driver Dr recognizes that the position of the single selection object (for example, pedestrian Pd1) of which the time to collision Ttc is equal to or less than the first time threshold Tht1 in the predetermined pre-collision time Tbc is not (almost) shifted from the virtual straight line IL-1 in the X-axis direction in the predetermined pre-collision time Tbc. Thus, the ECU 21 performs the process of the subroutine C.

When the ECU 21 determines that the determination result in S1212 is No, the projector unit 26 does not need to project the motion indicator 30 in the current time. Thus, the ECU 21 ends the process of the flowchart shown in FIG. 12 once.

Figure 15:
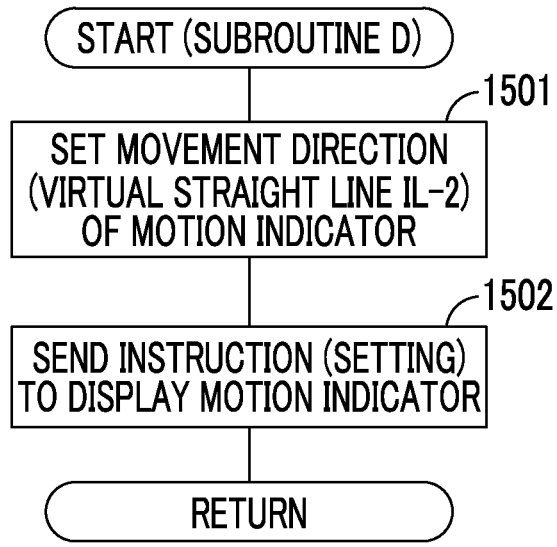
FIG. 15 is a flowchart showing a subroutine D performed by the ECU according to the embodiment of the disclosure.

Meanwhile, when the ECU determines that the determination result in S1211 is Yes, the ECU 21 proceeds to S1213, and proceeds to a subroutine D shown in FIG. 15. That is, when both the time to collision Ttc for the left selection object (pedestrian Pd1 in this case) and the time to collision Ttc for the right selection object (pedestrian Pd2 in this case) are equal to or less than the first time threshold Tht1, the ECU 21 proceeds to the subroutine D shown in FIG. 15.

In S1501, the ECU 21 that proceeds to the subroutine D sets the movement direction of the motion indicator 40 shown in FIG. 8 in the virtual display area DIA. In the present embodiment, the ECU determines, in advance, that the direction of the virtual straight line IL-2 is a predetermined direction, and information regarding the predetermined direction is recorded in the memory of the ECU 21. Accordingly, the ECU 21 reads the information of the direction of the virtual straight line IL-2 from the memory in S1501. The direction of the virtual straight line IL-2 is a direction (up-down direction) which passes through the center of the virtual display area DIA and is parallel to the Z-axis. Here, the projector unit 26 does not project an image corresponding to the virtual straight line IL-2. Thus, the driver Dr who recognizes the virtual display area DIA is not able to recognize the virtual straight line IL-2.

The ECU 21 that ends the process of S1501 proceeds to S1502. In the current time (=time t2), the ECU controls the projector unit 26 to read an image representing the motion indicator 40 from the memory, and causes the projector unit 26 to immediately project the image for a predetermined display time Tfp. The motion indicator 40 includes four indication components 40a, 40b, 40c, 40d which are separated from one another and are positioned in the virtual straight line IL-2. The indication components 40a, 40b, 40c, 40d have upwardly projected arc shapes. The dimensions of the indication components 40a, 40b, 40c, 40d in the direction perpendicular to the virtual straight line IL-2 gradually increase in the order of the indication components 40a, 40b, 40c, 40d. That is, the overall motion indicator 40 has a shape of which the width becomes wide toward the top. The dimension of the indication component 40d in the direction perpendicular to the virtual straight line IL-2 is greater than the dimension of the indication component 30a in the direction perpendicular to the virtual straight line IL-1.

Similarly to the motion indicator 30, the projector unit 26 sets a display timing of the motion indicator 40 (see FIG. 7B). That is, projection timings of the indication components 40a, 40b, 40c, 40d are different from one another. That is, the projector unit 26 projects the motion indicator 40 in the order of the indication components 40a, 40b, 40c, 40d. Thus, the driver Dr recognizes that the motion indicator 40 (indication components 40a, 40b, 40c, 40d) is moving from bottom to top in the virtual display area DIA. Projection times during which the indication components 40a, 40b, 40c, 40d are projected by the projector unit 26 are the same as those of the indication components 30a, 30b, 30c, 30d.

When the pedestrians Pd1, Pd2, Pd3 are positioned on both right and left sides of the central straight line CL as shown in FIG. 8, one motion indicator 30 having the shape of which the width thereof becomes narrow toward the top is not able to point at the pedestrians Pd1, Pd2, Pd3 at the same time. In other words, the driver Dr is not able to recognize that one motion indicator 30 points at the pedestrians Pd1, Pd2, Pd3. However, when the motion indicator 40 having the shape of which the width becomes wide toward the top is projected in the virtual display area DIA, the driver Dr is able to recognize that the motion indicator 40 points at the pedestrians Pd1, Pd2, Pd3. Thus, even when the pedestrians Pd1, Pd2, Pd3 are positioned on both right and left sides of the central straight line CL as shown in FIG. 8, the driver Dr who recognizes the virtual display area DIA (motion indicator 40) is able to reliably recognize the pedestrians Pd1, Pd2, Pd3.

The ECU 21 that ends the process of S1502 ends the process of the subroutine D once.

The ECU 21 that ends the process of the subroutine D (S1213) proceeds to S1214 of the routine shown in FIG. 12, and determines whether or not at least one of the time to collision Ttc for the left selection object (pedestrian Pd1 in this case) and the time to collision Ttc for the right selection object (pedestrian Pd2 in this case) is equal to or less than the second time threshold Tht2. When the ECU determines that the determination result in S1214 is Yes, the ECU 21 proceeds to S1208. As a result, the alarm device 18 provides the alarm sound to the driver Dr in order to attract the driver's attention, and the brake devices 19 automatically perform a braking operation. The ECU 21 ends the process of the flowchart of FIG. 12, and also ends the process of the flowchart of FIG. 11 once. Meanwhile, when the ECU determines that the determination result in S1214 is No, the ECU 21 ends the process of the flowchart of FIG. 12, and also ends the process of the flowchart of FIG. 11 once.

Figure 13:
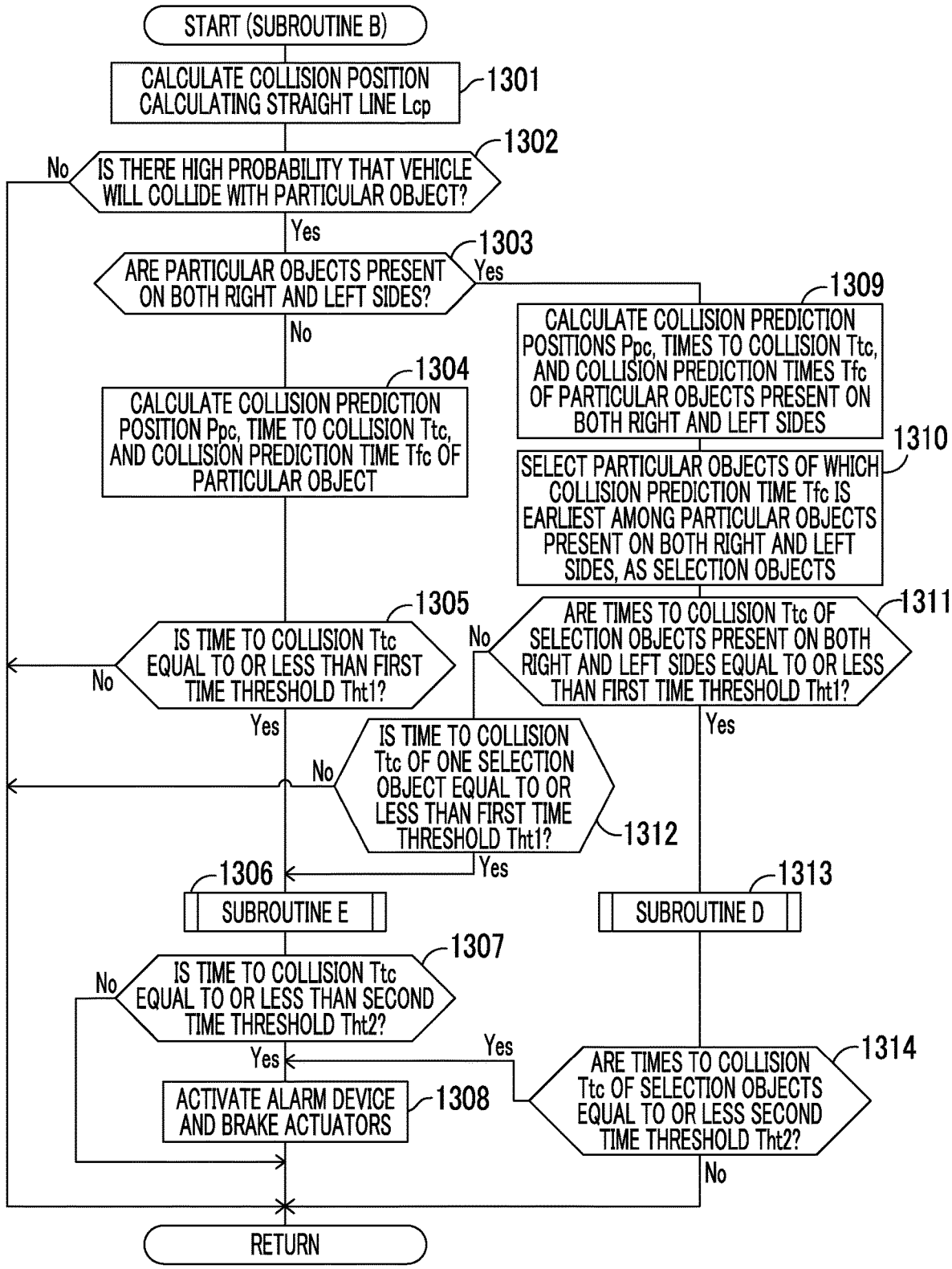
FIG. 13 is a flowchart showing a subroutine B performed by the ECU according to the embodiment of the disclosure.

When the vehicle 10 travels along the almost straight road 50S (that is, a road of which the curvature of the road 50S is less than the curvature threshold Thc) shown in FIG. 9, the ECU 21 determines that the determination result in S1102 of the flowchart of FIG. 11 is No, proceeds to S1104, and proceeds to the subroutine B shown in FIG. 13.

The subroutine B is the same as the subroutine A of FIG. 12 excepting S1306. That is, S1301 to S1314 are the same as S1201 to S1214 excepting S1306.

Accordingly, S1301 is also the same process as s1201. That is, in this case, the ECU 21 calculates the virtual relative positions Prl-0, Prl-1, Prl-2 of the pedestrian Pd relative to the vehicle 10 on the virtual straight road 50A shown in FIG. 5 based on the curvature (the turning track of the vehicle 10) of the road 50S and the object positions Po-0, Po-1, Po-2. When the road 50S has a complete straight shape, the road 50S has the substantially same shape as that of the virtual straight road 50A.

Figure 16:
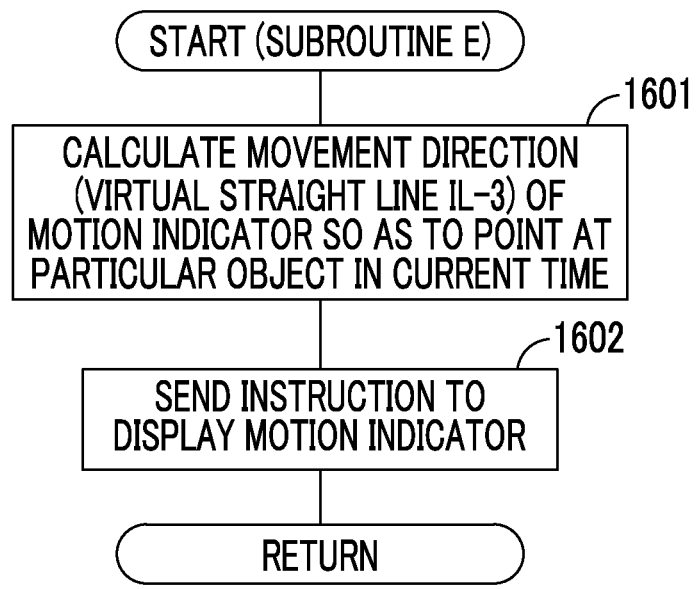
FIG. 16 is a flowchart showing a subroutine E performed by the ECU according to the embodiment of the disclosure.

The ECU 21 that proceeds to the subroutine B determines that the determination result in S1305 or S1312 is Yes, the ECU 21 proceeds to S1306, and proceeds to a subroutine E shown in FIG. 16.

In S1601, the ECU 21 calculates the movement direction (that is, the direction (slope) of the virtual straight line IL-3 shown in FIG. 10) of the motion indicator 30 shown in FIG. 10 in the virtual display area DIA. More specifically, the ECU 21 obtains the object estimation position Poe which is the intersection of the position estimating plane Cfa and a straight line that connects the eyeball reference position Pe and the relative position Po-2 of the particular object (pedestrian Pd) relative to the vehicle 10 in the current time (=time t2) by using the projection position calculating method. When the ECU 21 that ends S1312 proceeds to S1306 (that is, the subroutine E of FIG. 16), the particular object is a particular object for which the ECU determines that the time to collision Ttc is equal to or less than the first time threshold Tht1. The ECU 21 determines the position and slope (direction) of the virtual straight line IL-3 on the position estimating plane Cfa. That is, the ECU 21 determines the position and slope (direction) of the virtual straight line IL-3 such that the object estimation position Poe is positioned in the virtual straight line IL-3 (in the extension line of the virtual straight line IL-3). Here, the projector unit 26 does not project an image corresponding to the virtual straight line IL-3. Thus, the driver Dr who recognizes the virtual display area DIA is not able to recognize the virtual straight line IL-3.

The ECU 21 that ends the process of S1601 proceeds to S1602. The ECU controls the projector unit 26 to read the image (projection data) representing the motion indicator 30 from the memory in the current time (=time t2), and causes the projector unit 26 to immediately project the image for the display time Tfp. A time when the display time Tfp is ended is the predetermined pre-collision time Tbc earlier than the collision prediction time Tfc.

As a result, the motion indicator 30 is displayed such that the movement direction (in the extension line of the virtual straight line IL-3) of the motion indicator 30 is positioned in the relative position Po-2, as shown in FIG. 10. Thus, when the road 50S is not a straight line, there is a possibility that the driver Dr will recognize that "the position of the pedestrian Pd relative to the extension line (virtual straight line IL-3) of the motion indicator 30 in the movement direction is slightly shifted in the X-axis direction" in the predetermined pre-collision time Tbc. However, since the curvature of the road 50S is smaller than the curvature threshold Thc, the shift amount of the position of the pedestrian Pd shifted from the movement direction of the motion indicator 30 recognized by the driver Dr in the X-axis direction is smaller than a predetermined value in the predetermined pre-collision time Tbc. Accordingly, there is a lower possibility that the driver Dr will feel discomfort when the driver recognizes the motion indicator 30.

Meanwhile, when the road 50S has a complete straight shape, the driver Dr recognizes that "the pedestrian Pd is positioned in the extension line (virtual straight line IL-3) of the motion indicator 30 in the movement direction" in the predetermined pre-collision time Tbc. Accordingly, in this case, there is also a lower possibility that the driver Dr will feel discomfort when the driver recognizes the motion indicator 30 in the predetermined pre-collision time Tbc.

The ECU 21 that ends the process of S1602 ends the process of the subroutine E once.

When the ECU determines that the determination result in S1311 of the flowchart of FIG. 13 is Yes, the ECU 21 proceeds to S1313. In other words, the ECU 21 proceeds to the subroutine D of FIG. 15. That is, similarly to the case where the curvature of the road 50S is smaller than the curvature threshold Thc, when there are the particular objects on both right and left sides of the central straight line CL (for example, when there is the pedestrian Pd1 on the left side and there are the pedestrians Pd2, Pd3 on the right side), the projector unit 26 projects the motion indicator 40 that moves along the virtual straight line IL-2 shown in FIG. 8 for the display time Tfp.

The present disclosure is not limited to the embodiment, and may adopt various modification examples without departing from the scope of the present disclosure.

For example, when the curvature of the road along which the vehicle 10 travels is equal to or greater than the curvature threshold Thc, the projector unit 26 may project the motion indicator 30 such that the driver Dr recognizes that the particular object (for example, pedestrian Pd) is not positioned in the movement direction (in the virtual straight line IL-1) of the motion indicator 30 in the virtual display area DIA in the predetermined pre-collision time Tbc. Here, in this case, the projector unit 26 projects the motion indicator 30 such that the driver Dr recognizes that "the position shift amount of the particular object shifted from the movement direction (virtual straight line IL-1) of the motion indicator 30 in the X-axis direction is equal to or less than the predetermined value in the predetermined pre-collision time Tbc. That is, the position shift amount of the object estimation position Poe of the particular object shifted from the virtual straight line IL-1 in the X-axis direction on the position estimating plane Cfa is equal to or less than the predetermined value in the predetermined pre-collision time Tbc. For example, when it is assumed that the extension direction of the virtual straight line IL-1 when the particular object is positioned in the virtual straight line IL-1 in the virtual display area DIA in the predetermined pre-collision time Tbc is a reference direction, the predetermined value may be the position shift amount of the object estimation position Poe of the particular object shifted from virtual straight lines IL-1-L, IL-1-R (see virtual straight lines of FIG. 7A) in the X-axis direction when it is rotated (inclined) around the reference direction within a range of 15° in both directions (clockwise direction and counterclockwise direction). When the present disclosure is implemented in this aspect, there is a lower possibility that the driver Dr who visually perceives the pedestrian Pd and recognizes the motion indicator 30 will feel discomfort in the predetermined pre-collision time Tbc.

As shown in FIGS. 2 and 3, a radar sensor 60 may be provided at a front end of the vehicle 10. The radar sensor 60 is a known millimeter wave radar sensor, and is connected to the ECU 21. The radar sensor 60 transmits millimeter waves forward of the vehicle 10 according to an instruction of the ECU 21. The millimeter waves are reflected rearwards by an obstacle positioned in front of the vehicle 10. For example, when the pedestrian Pd is positioned in front of the vehicle 10, the millimeter waves are reflected rearwards by the pedestrian Pd. The reflected waves are received by the radar sensor 60. Detection wave information received by the radar sensor 60 is transmitted to the ECU 21. By doing this, the ECU 21 calculates the distance between the vehicle 10 and the pedestrian Pd and the direction of the pedestrian Pd based on the detection wave information. Thus, when the radar sensor 60 is provided at the vehicle 10, the ECU 21 may more accurately calculate the distance between the vehicle 10 and the obstacle (for example, pedestrian Pd) and the relative position (object position Po) of the obstacle relative to the vehicle 10 by using the radar sensor 60 and the camera 23. When the radar sensor 60 is provided at the vehicle 10, the camera 23 may be a monocular camera other than the stereo camera. Radar sensors that transmit millimeter waves forward from the right and left sides of the vehicle 10 may be provided on the right side of the front end or the left side of the front end of the vehicle 10, and the ECU 21 may obtain the distance between the vehicle and the obstacle and an azimuthal direction of the obstacle relative to the vehicle 10 by using these radar sensors similarly to the case where the radar sensor 60 is used.

The projector unit 26 may project motion indicators having shapes of modification examples shown in FIGS. 17 to 20C.

Figure 17:
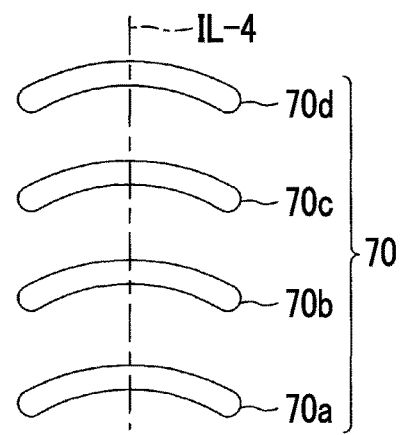
FIG. 17 is a schematic diagram showing a motion indicator of a first modification example of the disclosure.

A motion indicator 70 of a first modification example shown in FIG. 17 includes four indication components 70*a*, 70*b*, 70*c*, 70*d*. All the indication components 70*a*, 70*b*, 70*c*, 70*d* have arc shapes which are the same as one another. That is, the dimensions of the indication components 70*a*, 70*b*, 70*c*, 70*d* in the direction perpendicular to a virtual straight line IL-4 are the same as one another. Projection timings of the indication components 70*a*, 70*b*, 70*c*, 70*d* performed by the projector unit 26 are the same as those of the indication components 30*a*, 30*b*, 30*c*, 30*d*.

Figure 18:
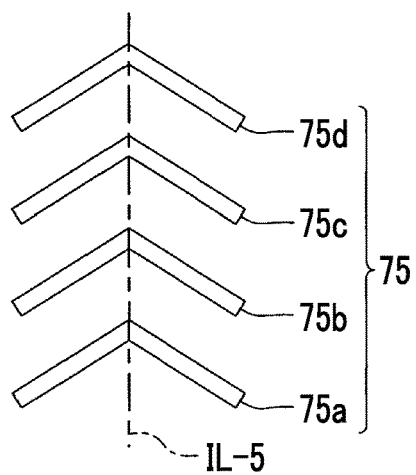
FIG. 18 is a schematic diagram showing a motion indicator of a second modification example of the disclosure.

A motion indicator 75 of a second modification example shown in FIG. 18 includes four indication components 75*a*, 75*b*, 75*c*, 75*d*. All the indication components 75*a*, 75*b*, 75*c*, 75*d* have V-shapes which are the same as one another. That is, the dimensions of the indication components 75*a*, 75*b*, 75*c*, 75*d* in the direction perpendicular to a virtual straight line IL-5 are the same as one another. Projection timings of the indication components 75*a*, 75*b*, 75*c*, 75*d* performed by the projector unit 26 are the same as those of the indication components 30*a*, 30*b*, 30*c*, 30*d*.

Figure 19:
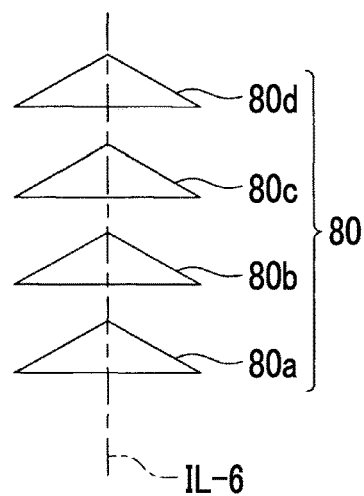
FIG. 19 is a schematic diagram showing a motion indicator of a third modification example of the disclosure.

A motion indicator 80 of a third modification example shown in FIG. 19 includes four indication components 80*a*, 80*b*, 80*c*, 80*d*. All the indication components 80*a*, 80*b*, 80*c*, 80*d* have triangular shapes which are the same as one another. That is, the dimensions of the indication components 80*a*, 80*b*, 80*c*, 80*d* in the direction perpendicular to a virtual straight line IL-6 are the same as one another. Projection timings of the indication components 80*a*, 80*b*, 80*c*, 80*d* performed by the projector unit 26 are the same as those of the indication components 30*a*, 30*b*, 30*c*, 30*d*.

The dimensions of the indication components 75*a*, 75*b*, 75*c*, 75*d* in the direction perpendicular to the virtual straight line IL-5 may gradually decrease in the order of the indication components 75*a*, 75*b*, 75*c*, 75*d*, or may gradually increase in the order of the indication components 75*a*, 75*b*, 75*c*, 75*d*. Similarly, the dimensions of the indication components 80*a*, 80*b*, 80*c*, 80*d* in the direction perpendicular to the virtual straight line IL-6 may gradually decrease in the order of the indication components 80*a*, 80*b*, 80*c*, 80*d*, or may gradually increase in the order of the indication components 80*a*, 80*b*, 80*c*, 80*d*.

The projector unit 26 may project the motion indicators 30, 40, 70, 75, 80 such that the driver Dr temporarily recognizes all the indication components of the motion indicators 30, 40, 70, 75, 80 at the same time.

A motion indicator 85 of a fourth modification example shown in FIGS. 20A, 20B, and 20C includes three indication components 85*a*, 85*b*, 85*c* positioned in a virtual straight line IL-7. The shapes of the indication components 85*a*, 85*b*, 85*c* are different from one another. That is, the indication component 85*a* is a triangle, the indication component 85*b* is a circle, and the indication component 85*c* is a square. As shown in FIG. 20A, the projector unit 26 initially projects the indication component 85*a*. As shown in FIG. 20B, the projector unit 26 subsequently projects the indication component 85*b*. The position of the indication component 85*b* in the virtual display area DIA in this case is the position of the indication component 85*a* in FIG. 20A. In this case, the indication component 85*a* moves upwards in the virtual display area DIA from the position of the FIG. 20A. As shown in FIG. 20C, the projector unit 26 subsequently projects the indication component 85*c*. The position of the indication component 85*c* in the virtual display area DIA in this case is the position of the indication component 85*b* in FIG. 20B. The position of the indication component 85*b* in the virtual display area DIA in this case is the position of the indication component 85*a* in FIG. 20B. In this case, the indication component 85*a* further moves upwards in the virtual display area DIA from the position of FIG. 20B. When the predetermined display time Tfp elapses from the projection start time of the indication component 85*a* performed by the projector unit 26, the projection of the indication components 85*a*, 85*b*, 85*c* is ended at the same time.

The number of indication components constituting each of the indication components 30, 40, 70, 75, 80, 85 may be an arbitrary number as long as the motion indicator includes the indication components.

When the curvature of the road along which the vehicle 10 travels is smaller than the curvature threshold Thc, the ECU 21 may perform the process of the subroutine A. According to the modification examples, when the vehicle 10 travels along the road of which the curvature is greater than zero and is smaller than the curvature threshold Thc, there is a lower possibility that the driver Dr will recognize that "the position of the pedestrian Pd is shifted from the extension line (virtual straight line IL-3) of the motion indicator 30 in the movement direction in the X-axis direction" in the predetermined pre-collision time Tbc.

When the particular object (for example, pedestrian Pd) moves on the road, the ECU 21 may calculate the collision position calculating straight line Lcp, the pre-collision prediction position Pbc, the collision prediction position Ppc, the collision prediction time Tfc, the time to collision Ttc, and the predetermined pre-collision time Tbc by taking account of the relative speed of the particular object relative to the vehicle 10.

For example, the virtual display area DIA (virtual image VI) in which the HUD 25 is formed may be positioned on the windshield 12 by using the combiner.

What is claimed is:

1. A driving assistance apparatus for a vehicle, the driving assistance apparatus comprising:
   an imaging device configured to capture a front scene that is a scene in front of a transparent window and is visually perceived by an occupant seated on a driver seat of a vehicle through the window positioned directly ahead of the driver seat;
   an electronic control unit configured to
      calculate a turning track of the vehicle based on a detection value that is a quantity indicating a turning state of the vehicle that is detected by a turning state quantity detection device,
      determine whether there is a particular object in the front scene based on image data captured by the imaging device,
      acquire relative positional information that is information regarding a relative position of the particular object relative to the vehicle,
      determine whether the vehicle and the particular object are to collide with each other based on the relative positional information and the turning track when the electronic control unit determines that there is the particular object and the vehicle,
      obtain a collision prediction time that is a time predicted that the vehicle and the particular object are to collide with each other and a collision prediction position of the vehicle relative to the particular object based on the relative positional information, the turning track, and a vehicle speed of the vehicle detected by a vehicle speed detection device when the electronic control unit determines that there is a relatively high probability that the vehicle and the particular object are to collide with each other, and obtain a relative position of the particular object in a predetermined pre-collision time that is later than a current time and is earlier than the collision prediction time based on the relative positional information and the collision prediction position; and a head-up display device configured to form a virtual image of a predetermined indicator that is recognized by the occupant when eyes of the occupant are in a particular positional relationship with a predetermined position on the window or in a virtual display area set in front of the window by projecting the indicator for a predetermined display time of which an end time matches the predetermined pre-collision time on the window when a time to collision is equal to or less than a predetermined time threshold, wherein:

when a position in which a straight line that connects the predetermined position and a position of the particular object intersects with a particular object estimation position, wherein the particular object estimation position is a virtual position estimating plane positioned on the same plane as the virtual display area and the indicator is a motion indicator that moves such that a tip end of the indicator approaches the particular object estimation position along a virtual straight line set in the virtual display area with a lapse of time; and the electronic control unit is configured to perform control such that a position shift amount of the particular object estimation position shifted from the virtual straight line in a width direction of the vehicle on the virtual position estimating plane is equal to or less than a predetermined value in the predetermined pre-collision time, wherein the electronic control unit is configured to perform control such that the particular object estimation position is positioned in the virtual straight line on the virtual position estimating plane in the predetermined pre-collision time, and wherein the particular object estimation position is the intersection of the virtual position estimating plane and a straight line that connects the eyeball reference position and the pre-collision prediction position.

2. The driving assistance apparatus according to claim 1, wherein:

the motion indicator includes a plurality of indication components arranged along the virtual straight line; and the head-up display device is configured to display the indication components in the virtual display area in order from the indication component positioned on a side opposite to the tip end.

3. The driving assistance apparatus according to claim 2, wherein the motion indicator is displayed such that dimensions of the indication components in a direction perpendicular to the virtual straight line decrease in order from the indication component positioned on a side opposite to the tip end.

* * * * *